(12) United States Patent
Hirata et al.

(10) Patent No.: US 9,626,964 B2
(45) Date of Patent: Apr. 18, 2017

(54) VOICE RECOGNITION TERMINAL, SERVER, METHOD OF CONTROLLING SERVER, VOICE RECOGNITION SYSTEM, NON-TRANSITORY STORAGE MEDIUM STORING PROGRAM FOR CONTROLLING VOICE RECOGNITION TERMINAL, AND NON-TRANSITORY STORAGE MEDIUM STORING PROGRAM FOR CONTROLLING SERVER

(71) Applicant: Sharp Kabushiki Kaisha, Osaka-shi, Osaka (JP)

(72) Inventors: Masafumi Hirata, Osaka (JP); Akira Tojima, Osaka (JP); Yuri Iwano, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 186 days.

(21) Appl. No.: 14/552,109

(22) Filed: Nov. 24, 2014

(65) Prior Publication Data

US 2015/0149175 A1 May 28, 2015

(30) Foreign Application Priority Data

Nov. 27, 2013 (JP) .................................. 2013-244885

(51) Int. Cl.
*G10L 15/00* (2013.01)
*G10L 17/00* (2013.01)
(Continued)

(52) U.S. Cl.
CPC .............. *G10L 15/22* (2013.01); *G10L 15/30* (2013.01)

(58) Field of Classification Search
None
See application file for complete search history.

(56) References Cited

U.S. PATENT DOCUMENTS 6,487,534 B1 * 11/2002 Thelen .................... G10L 15/26
704/270
8,239,206 B1 * 8/2012 LeBeau ................. H04M 1/271
704/251

(Continued)

FOREIGN PATENT DOCUMENTS

JP 2009-237439 A 10/2009
JP 2012-501480 A 1/2012
(Continued)

*Primary Examiner* — Satwant Singh
(74) *Attorney, Agent, or Firm* — Birch, Stewart, Kolasch & Birch, LLP

(57) ABSTRACT

A voice recognition terminal is provided to be able to communicate with a server capable of voice recognition for recognizing voice, and includes a voice input acceptance portion accepting voice input from a user, a voice recognition portion carrying out voice recognition of the voice input accepted, a response processing execution portion performing processing for responding to the user based on a result of voice recognition of the voice input accepted, and a communication portion transmitting the voice input accepted by the voice input acceptance portion to the server and receiving a result of voice recognition in the server. The response processing execution portion performs the processing for responding to the user based on the result of voice recognition determined as more suitable, of the result of voice recognition by the voice recognition portion and the result of voice recognition received from the server.

12 Claims, 23 Drawing Sheets

(51) Int. Cl.
*G10L 21/00* (2013.01)
*G10L 15/22* (2006.01)
*G10L 15/30* (2013.01)

(56) References Cited

U.S. PATENT DOCUMENTS

| | | | |
|---|---|---|---|
| 2002/0046023 A1* | 4/2002 | Fujii | G10L 15/30 |
| | | | 704/231 |
| 2010/0057450 A1* | 3/2010 | Koll | G10L 15/32 |
| | | | 704/231 |
| 2013/0277665 A1 | 10/2013 | Nakata et al. | |
| 2014/0129222 A1 | 5/2014 | Okamoto | |
| 2015/0206530 A1* | 7/2015 | Choi | G10L 15/22 |
| | | | 704/249 |
| 2015/0206534 A1* | 7/2015 | Shinkai | G10L 15/22 |
| | | | 704/270.1 |
| 2015/0287413 A1* | 10/2015 | Jung | G10L 15/32 |
| | | | 704/231 |
| 2016/0063995 A1* | 3/2016 | Choi | G06F 3/0482 |
| | | | 704/245 |

FOREIGN PATENT DOCUMENTS

| | | |
|---|---|---|
| JP | 2012-209151 A | 10/2012 |
| JP | 2013-64777 A | 4/2013 |
| WO | WO 2009-237439 A1 | 2/2009 |
| WO | WO 2013/027360 A1 | 2/2013 |

\* cited by examiner

FIG.3

| RECOGNITION PHRASE | ANSWER PHRASE |
|---|---|
| I'M TIRED | THAT'S TERRIBLE |
| I'M TIRED | THEN, TAKE A LITTLE REST ? |
| I'M TIRED | YOU WILL SURELY GROW YOURSELF, WON'T YOU ? |
| I'M TIRED | ARE YOU OK ? |
| I'M SLEEPY | I SEE, THEN, ARE YOU GOING TO BED ? |
| I'M SLEEPY | I WILL ALSO GO TO BED ? |
| I'M SLEEPY | TAKE IT EASY. TAKE A GOOD REST ? |
| I'M SLEEPY | DID YOU TAKE A BATH ? |
| I'M HOME | OH, GOOD |
| I'M HOME | YOU MUST BE TIRED |
| I'M HOME | ARE YOU GOING TO EAT ? |
| I'M HOME | YOU MUST BE TIRED AGAIN TODAY |
| I GOT A SCOLDING TODAY | THAT'S TERRIBLE |
| I GOT A SCOLDING TODAY | LET'S FORGET |
| I GOT A SCOLDING TODAY | YOU GOT A SCOLDING ? CHEER UP ? |
| I GOT A SCOLDING TODAY | IS THAT SO |
| I WAS IN A FIGHT TODAY | THAT'S TERRIBLE |
| I WAS IN A FIGHT TODAY | DO THE CLEANING FOR CHANGE OF YOUR STATE OF MIND ? |
| I WAS IN A FIGHT TODAY | DID YOU MAKE UP ? |
| I WAS IN A FIGHT TODAY | COME ON |
| I'M GOING | ARE YOU REALLY GOING ? |
| I'M GOING | BE BACK EARLY |
| I'M GOING | CAN YOU LOOK AFTER THE HOUSE WELL ? |
| CLEAN UP | START CLEANING |

FIG.9

| STATE OF CLEANING ROBOT | RECOGNITION DICTIONARY | DESCRIPTION OF DICTIONARY |
|---|---|---|
| NORMAL MODE | NORMAL DICTIONARY | COMMON PHRASES AND CONTROL PHRASES FOR OPERATING CLEANING ROBOT |
| SERVER MODE (LAST AND FIRST) | LAST AND FIRST DICTIONARY | PHRASES AND CONTROL PHRASES FOR PLAYING LAST AND FIRST GAME (EXAMPLE: "SUGAR", "RICE", "END LAST AND FIRST" IN THE CASE OF LAST AND FIRST) |
| SERVER MODE (POSTAL CODE) | POSTAL CODE DICTIONARY | NUMBERS AND CONTROL PHRASES FOR RECOGNIZING POSTAL CODES (EXAMPLE: "1", "2", "3", "END OF SETTING") |
| SERVER MODE (YES/NO) | YES/NO DICTIONARY | "YES", "NO", AND CONTROL PHRASES (EXAMPLE: "YES", "NO", "END OF SETTING") |

FIG.10

| NORMAL DICTIONARY | | |
|---|---|---|
| RECOGNITION PHRASE | ANSWER PHRASE | STATE |
| LET'S PLAY LAST AND FIRST | I START LAST AND FIRST. SUGAR + CHANGE TO SERVER MODE | SERVER MODE (LAST AND FIRST) |
| CLEAN UP | START CLEANING | — |
| TODAY'S WEATHER | REGISTERED: WEATHER INFORMATION | — |
| | NOT REGISTERED: I INITIALLY SET POSTAL CODE. SAY LIKE ONE, ZERO, THREE. + CHANGE TO SERVER MODE | SERVER MODE (POSTAL CODE) |

FIG.11

| LAST AND FIRST DICTIONARY | | |
|---|---|---|
| RECOGNITION PHRASE | ANSWER PHRASE | STATE |
| SUGAR | SUGAR. RICE | — |
| RICE | RICE. EAST | — |
| END LAST AND FIRST | I END LAST AND FIRST.<br>+ CHANGE TO NORMAL MODE | NORMAL MODE |
| CLEAN UP | LAST AND FIRST HAS ENDED.<br>+ START CLEANING<br>+ CHANGE TO NORMAL MODE | NORMAL MODE |

FIG.12

| CLEANING ROBOT ID | STATE OF CLEANING ROBOT | POSTAL CODE | PREVIOUS RECOGNITION TIME |
|---|---|---|---|
| ID1 | NORMAL MODE | NOT YET SET | 2013/11/13 17:30:05 |
| ID2 | SERVER MODE (LAST AND FIRST) | 261-0013 | 2013/11/13 16:00:10 |
| ID3 | SERVER MODE (POSTAL CODE) | NOT YET SET | 2013/11/13 17:40:15 |
| ID4 | SERVER MODE (YES/NO) | NOT YET SET | 2013/11/13 17:20:14 |

| POSTAL CODE DICTIONARY | | |
|---|---|---|
| RECOGNITION PHRASE | ANSWER PHRASE | STATE |
| TWO, SIX, ONE | IS XXX CORRECT ? ANSWER WITH YES OR NO. | SERVER MODE (YES/NO) |
| END OF SETTING | I END SETTING. | NORMAL MODE |

(B)

| YES/NO DICTIONARY | | |
|---|---|---|
| RECOGNITION PHRASE | ANSWER PHRASE | STATE |
| YES | I HAVE REGISTERED YYY. + WEATHER INFORMATION + CHANGE TO NORMAL MODE | NORMAL MODE |
| NO | SAY ONCE AGAIN. | SERVER MODE (POSTAL CODE) |
| END OF SETTING | I END SETTING. | NORMAL MODE |

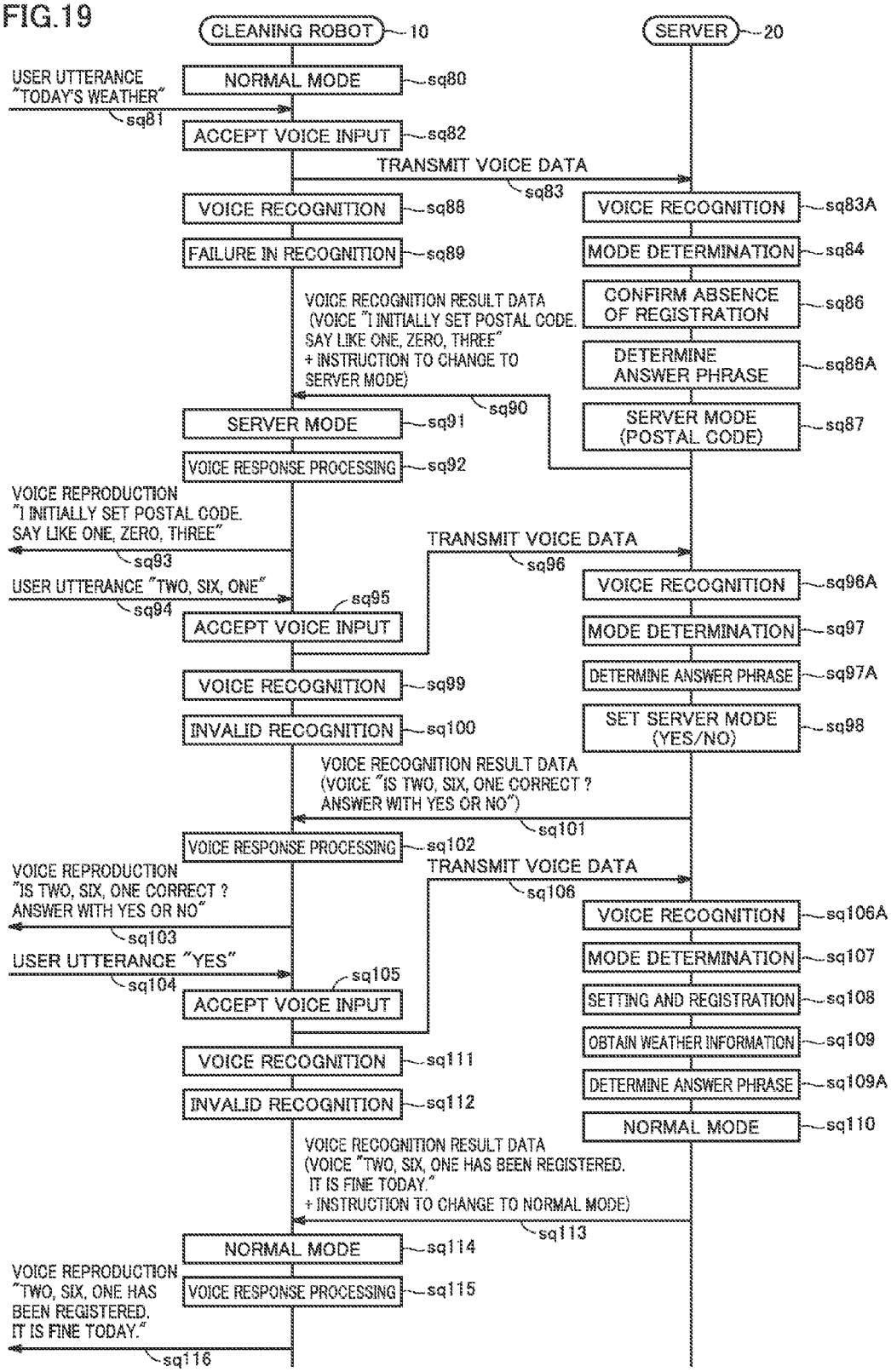

under a control of the voice recognition terminal when data for obtaining the prescribed information has not been registered.

VOICE RECOGNITION TERMINAL, SERVER, METHOD OF CONTROLLING SERVER, VOICE RECOGNITION SYSTEM, NON-TRANSITORY STORAGE MEDIUM STORING PROGRAM FOR CONTROLLING VOICE RECOGNITION TERMINAL, AND NON-TRANSITORY STORAGE MEDIUM STORING PROGRAM FOR CONTROLLING SERVER

This nonprovisional application is based on Japanese Patent Application No. 2014-244885 filed with the Japan Patent Office on Nov. 27, 2013, the entire contents of which are hereby incorporated by reference.

BACKGROUND OF THE INVENTION

Field of the Invention

The present disclosure relates to a voice recognition terminal providing pseudo communication, a server, a method of controlling a server, a voice recognition system, a non-transitory storage medium storing a program for controlling a voice recognition terminal, and a non-transitory storage medium storing a program for controlling a server.

Description of the Background Art

A voice recognition system of a client-server type in which voice recognition processing is performed with the use of a client device (also referred to as a terminal device) such as a portable terminal and a server device connected through a network has been made use of as a voice recognition device.

In such a voice recognition system, a scheme in which when voice recognition by a terminal device is difficult, a result of voice recognition is output to a server device for voice recognition by the server device and a result thereof is output from the terminal device has been adopted.

SUMMARY OF THE INVENTION

In such a voice recognition system, voice recognition processing in the server device is performed based on a result of voice recognition in the terminal device. Therefore, it takes time for a result of voice recognition obtained from the server device, a time period for output of a response from the terminal device is long for a user who makes use of the terminal device, and smooth communication cannot be achieved.

A voice recognition terminal according to one aspect of the present disclosure is provided to be able to communicate with a server capable of voice recognition for recognizing voice, and includes a voice input acceptance portion accepting voice input from a user, a voice recognition portion carrying out voice recognition of the voice input accepted by the voice input acceptance portion, a response processing execution portion performing processing for responding to the user based on a result of voice recognition of the voice input accepted by the voice input acceptance portion, and a communication portion transmitting the voice input accepted by the voice input acceptance portion to the server and receiving a result of voice recognition in the server. The response processing execution portion performs the processing for responding to the user based on the result of voice recognition determined as more suitable, of the result of voice recognition by the voice recognition portion and the result of voice recognition received from the server.

Preferably, the response processing execution portion performs the processing for responding to the user based on the result of voice recognition obtained earlier, of the result of voice recognition by the voice recognition portion and the result of voice recognition received from the server.

Preferably, the response processing execution portion does not perform the processing for responding to the user based on the result of voice recognition obtained later.

Preferably, voice recognition recognizes the voice and calculates reliability indicating correctness of recognition, and the response processing execution portion further performs the processing for responding to the user based on the later obtained result of voice recognition when reliability included in the later obtained result of voice recognition is higher than reliability included in the earlier obtained result of voice recognition, in connection with reliability included in the result of voice recognition by the voice recognition portion.

In particular, the response processing execution portion further performs the processing for responding to the user based on the later obtained result of voice recognition when reliability included in the earlier obtained result of voice recognition is equal to or lower than prescribed reliability and when reliability included in the later obtained result of voice recognition is higher than reliability included in the earlier obtained result of voice recognition, in connection with reliability included in the result of voice recognition by the voice recognition portion.

Preferably, an operation mode switching portion switching between a server mode in which the voice recognition terminal operates in accordance with an instruction from the server and a normal mode in which the voice recognition terminal operates by selectively making use of the instruction from the server based on the result of voice recognition of the voice input provided to the voice input acceptance portion is further provided.

In particular, the response processing execution portion invalidates the result of voice recognition by the voice recognition portion in the server mode.

A server provided to be able to communicate with a voice recognition terminal capable of voice recognition for recognizing voice according to one aspect of the present disclosure includes a voice input reception portion receiving voice input from a user through the voice recognition terminal, a voice recognition portion carrying out voice recognition of the voice input received by the voice input reception portion, and a response processing execution instruction portion instructing the voice recognition terminal to perform processing for responding to the user based on a result of voice recognition of the voice input received by the voice input reception portion, and the response processing execution instruction portion instructs the voice recognition terminal to switch from a normal mode in which the voice recognition terminal operates by selectively making use of an instruction from the server to a server mode instructing the voice recognition terminal to operate in accordance with the instruction from the server.

Preferably, the response processing execution instruction portion determines whether or not the result of voice recognition of the voice input accepted by the voice input reception portion is a request for a query about prescribed information from the user, determines whether or not data for obtaining the prescribed information has been registered when it is determined that the result is the request for the query about the prescribed information, and indicates execution of response processing inviting the user to input the data when the data for obtaining the prescribed information has not been registered, based on a result of determination.

A method of controlling a server provided to be able to communicate with a voice recognition terminal capable of voice recognition for recognizing voice according to one aspect of the present disclosure includes the steps of receiving voice input from a user through the voice recognition terminal, carrying out voice recognition of the received voice input, and instructing the voice recognition terminal to perform processing for responding to the user based on a result of voice recognition of the received voice input, and the step of instructing the voice recognition terminal to perform processing for responding includes the step of indicating switching from a normal mode in which the voice recognition terminal operates by selectively making use of an instruction from the server to a server mode instructing the voice recognition terminal to operate in accordance with the instruction from the server.

A voice recognition system according to one aspect of the present disclosure includes a server capable of voice recognition for recognizing voice and a voice recognition terminal provided to be able to communicate with the server. The voice recognition terminal includes a voice input acceptance portion accepting voice input from a user, a voice recognition portion carrying out voice recognition of the voice input accepted by the voice input acceptance portion, a response processing execution portion performing processing for responding to the user based on a result of voice recognition of the voice input accepted by the voice input acceptance portion, and a communication portion transmitting the voice input accepted by the voice input acceptance portion to the server and receiving a result of voice recognition in the server. The response processing execution portion performs the processing for responding to the user based on the result of voice recognition determined as more suitable, of the result of voice recognition by the voice recognition portion and the result of voice recognition received from the server.

A non-transitory recording medium storing a control program executed in a computer of a voice recognition terminal provided to be able to communicate with a server capable of voice recognition for recognizing voice according to one aspect of the present disclosure is provided, and the control program causes the computer to perform the steps of accepting voice input from a user, carrying out voice recognition of the received voice input, performing processing for responding to the user based on a result of voice recognition of the accepted voice input, and transmitting the accepted voice input to the server and receiving a result of voice recognition in the server. The step of performing processing for responding includes the step of performing the processing for responding to the user based on the result of voice recognition determined as more suitable, of the result of voice recognition based on the step of carrying out voice recognition and the result of voice recognition received from the server.

A non-transitory recording medium storing a control program executed in a computer of a server provided to be able to communicate with a voice recognition terminal capable of voice recognition for recognizing voice according to one aspect of the present disclosure is provided, and the control program causes the computer to perform the steps of receiving voice input from a user through the voice recognition terminal, carrying out voice recognition of the received voice input, and instructing the voice recognition terminal to perform processing for responding to the user based on a result of voice recognition of the received voice input. The step of instructing the voice recognition terminal to perform processing for responding includes the step of indicating switching from a normal mode in which the voice recognition terminal operates by selectively making use of an instruction from the server to a server mode instructing the voice recognition terminal to operate in accordance with the instruction from the server.

A method of controlling a voice recognition terminal provided to be able to communicate with a server capable of voice recognition for recognizing voice according to one aspect of the present disclosure includes accepting voice input from a user, carrying out voice recognition of the accepted voice input, performing processing for responding to the user based on a result of voice recognition of the accepted voice input, and transmitting the accepted voice input to the server and receiving a result of voice recognition in the server. Performing processing for responding includes performing processing for responding to the user based on the result of voice recognition determined as more suitable, of the result of voice recognition of the accepted voice input and the result of voice recognition received from the server.

Preferably, performing processing for responding includes performing processing for responding to the user based on the result of voice recognition obtained earlier, of the result of voice recognition of the accepted voice input and the result of voice recognition received from the server.

Preferably, performing processing for responding includes not performing the processing for responding to the user based on the result of voice recognition obtained later.

Preferably, carrying out voice recognition includes recognizing the voice and calculating reliability representing correctness of recognition, and performing the processing for responding includes further performing processing for responding to the user based on the result of voice recognition obtained later when reliability included in the later obtained result of voice recognition is higher than reliability included in the result of voice recognition obtained earlier, in connection with reliability included in the result of voice recognition of the accepted voice input.

Preferably, performing processing for responding includes further performing the processing for responding to the user based on the later obtained result of voice recognition when reliability included in the earlier obtained result of voice recognition is equal to or lower than prescribed reliability and when reliability included in the later obtained result of voice recognition is higher than reliability included in the earlier obtained result of voice recognition, in connection with reliability included in the result of voice recognition of the accepted voice input.

Preferably, switching between a server mode in which the voice recognition terminal operates in accordance with an instruction from the server and a normal mode in which the voice recognition terminal operates by selectively making use of the instruction from the server based on the result of voice recognition of the accepted voice input is further included.

Preferably, performing processing for responding includes invalidating the result of voice recognition of the accepted voice input in the server mode.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram illustrating an utterance content database based on the present embodiment.

FIG. 9 is a diagram illustrating a plurality of operation modes based on the present third embodiment.

FIG. 10 is a diagram illustrating a normal dictionary based on the present third embodiment.

FIG. 11 is a diagram illustrating a last and first dictionary based on the present third embodiment.

FIG. 12 is a diagram illustrating information stored in a state storage portion 233 based on the present third embodiment.

FIG. 18 is a diagram illustrating a postal code dictionary and a yes/no dictionary based on the present fourth embodiment.

FIG. 19 is a sequence diagram showing a flow of response processing in obtaining weather information (No. 1) in voice recognition system 1 based on the fourth embodiment.

DESCRIPTION OF THE PREFERRED EMBODIMENTS

Figure 1:
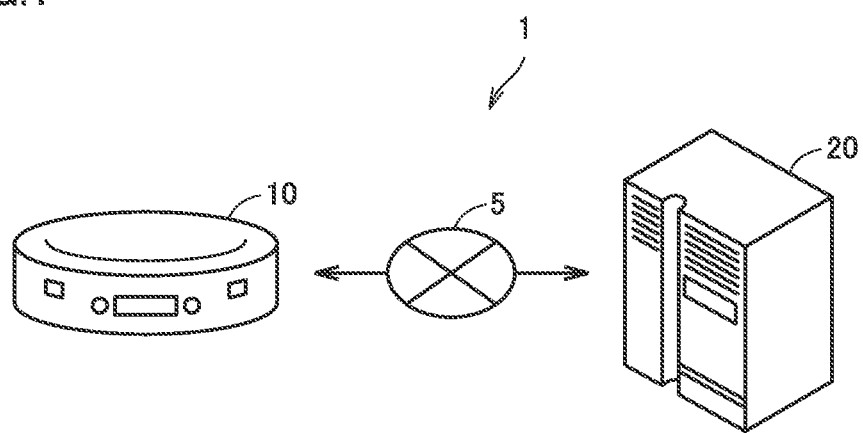
FIG. 1 is a diagram illustrating a voice recognition system 1 based on the present embodiment.

The present embodiment will be described hereinafter with reference to the drawings. When the number and a quantity are mentioned in the description of the embodiment, the scope of the present disclosure is not necessarily limited to the number and the quantity, unless otherwise specified. In the description of the embodiment, the same or corresponding elements have the same reference characters allotted and redundant description may not be repeated. Combination for use of features shown in a configuration shown in the embodiment as appropriate is originally intended, unless otherwise restricted.

First Embodiment (Configuration of Voice Recognition System 1)

FIG. 1 is a diagram illustrating a voice recognition system 1 based on the present embodiment.

Referring to FIG. 1, voice recognition system 1 based on the present embodiment is constituted of a cleaning robot (a voice recognition terminal) 10, a network 5, and a server 20.

Cleaning robot 10 is provided to be able to communicate with server 20 through network 5. Though communication with server 20 through network 5 is described in the present example, cleaning robot 10 may directly communicate with server 20.

In voice recognition system 1, when cleaning robot 10 accepts input of voice uttered by a person (a user), cleaning robot 10 or server 20 carries out voice recognition, and cleaning robot 10 outputs voice representing a content of response to the input voice (hereinafter also denoted as "response voice").

Thus, voice recognition system 1 according to the present embodiment realizes pseudo conversation between the user and cleaning robot 10.

Though cleaning robot 10 recognizing voice and outputting answer voice to the user is described by way of example of a voice recognition terminal in the present embodiment, the present disclosure is not limited thereto. For example, a doll having a voice recognition function or a home electrical appliance other than cleaning robot 10 (such as a television or a microwave oven) can also be adopted as a voice recognition terminal.

Though a configuration in which server 20 is implemented by a single server is described by way of example in the present embodiment, the present disclosure is not limited thereto and a configuration in which at least some of portions (functions) of server 20 may be implemented by other servers may be adopted.

(Configuration of Main Portion of Voice Recognition System 1)

Figure 2:
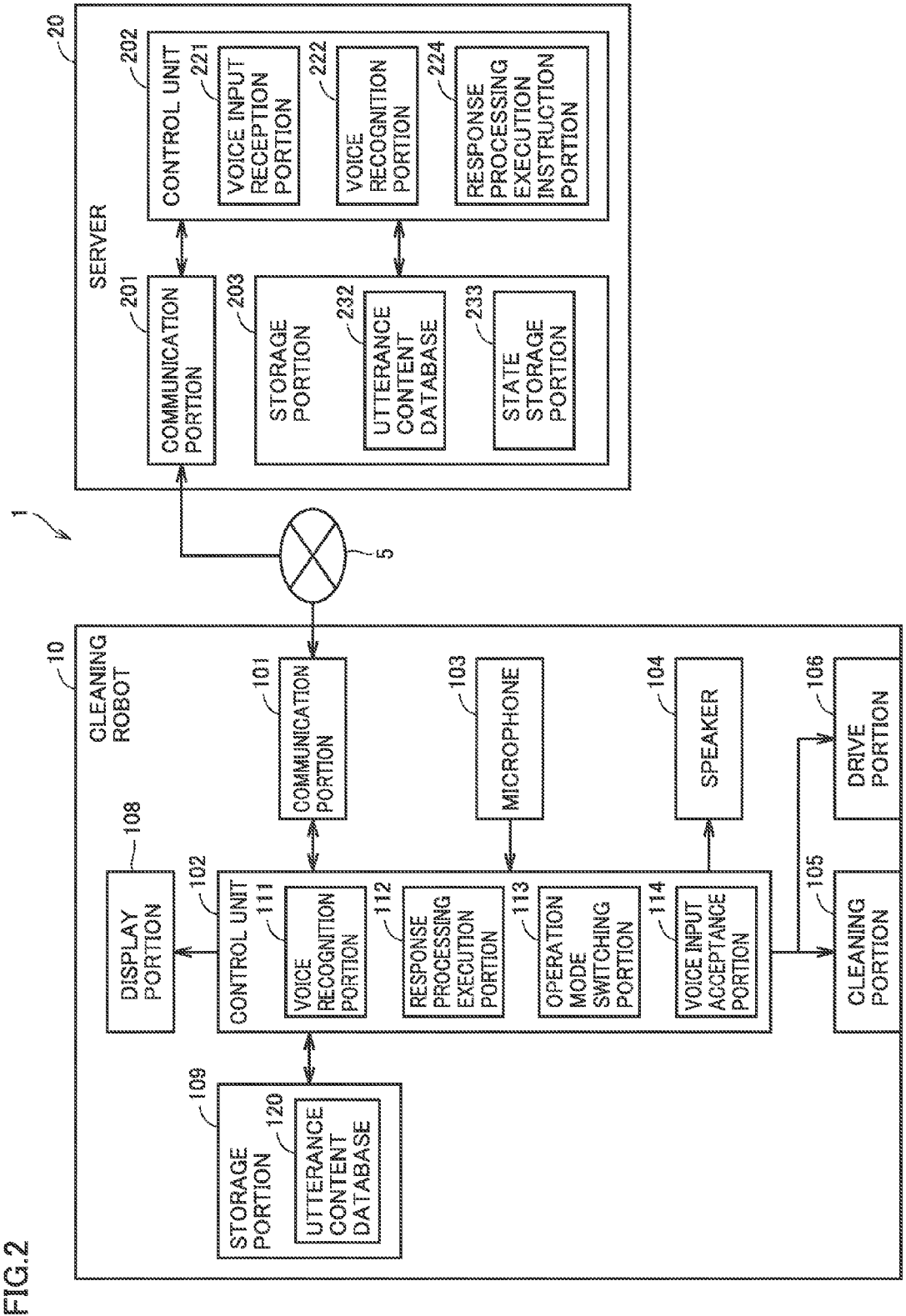
FIG. 2 is a diagram illustrating a configuration of a main portion of voice recognition system 1 according to the present embodiment.

FIG. 2 is a diagram illustrating a configuration of a main portion of voice recognition system 1 according to the present embodiment.

A configuration of cleaning robot 10 will initially be described with reference to FIG. 2.

Cleaning robot 10 based on the present embodiment includes a communication portion 101, a control unit 102, a microphone 103, a speaker 104, a cleaning portion 105, a drive portion 106, a display portion 108, and a storage portion 109.

Communication portion 101 carries out communication with the outside. Specifically, communication portion 101 communicates with server 20 through network 5 such as the Internet. Any of wireless and wired communication is applicable.

Microphone 103 accepts input of sound from the outside. Though input of data of sound included in a frequency band of voice mainly uttered by a person (also referred to as voice data) is accepted in the present embodiment, data of sound including a frequency band other than the frequency band of the voice data may be included in sound data representing sound of which input is accepted by microphone 103. Microphone 103 outputs voice data representing input sound to control unit 102.

Speaker 104 outputs response voice representing a response content output from control unit 102. Output of response voice provided by cleaning robot 10 through speaker 104 is hereinafter also denoted as "utterance". Details of the response content will be described later.

Cleaning portion 105 realizes a function as a cleaner based on an instruction from control unit 102.

Drive portion 106 moves cleaning robot 10 based on an instruction from control unit 102.

As cleaning portion 105 and drive portion 106 operate in cooperation, cleaning robot 10 can automatically clean rooms.

Display portion 108 realizes various display functions in accordance with an instruction from control unit 102.

Storage portion 109 is a storage device such as a random access memory (RAM) and a flash memory, and stores a program for realizing various functions of cleaning robot 10. Storage portion 109 has an utterance content database 120 representing information on output of voice response by way of example.

Control unit 102 is mainly configured with a central processing unit (CPU) and realizes a function of each portion as the CPU executes a program stored in storage portion 109.

Control unit 102 controls each portion of cleaning robot 10 in a centralized manner. Specifically, control unit 102 controls a cleaning operation by cleaning robot 10 by controlling cleaning portion 105 and drive portion 106. Control unit 102 transmits voice data representing sound externally obtained by microphone 103 to server 20 through communication portion 101.

Control unit 102 receives voice recognition result data resulting from voice recognition by server 20 of voice data transmitted to server 20 through communication portion 101. Then, control unit 102 can output voice response representing a response content from speaker 104 in accordance with the received voice recognition result data.

A main functional configuration of control unit 102 will be described. Control unit 102 includes a voice recognition portion 111, a response processing execution portion 112, an operation mode switching portion 113, and a voice input acceptance portion 114.

Voice input acceptance portion 114 detects (extracts) voice data. More specifically, voice input acceptance portion 114 detects voice data by extracting a frequency band of voice uttered by a person from externally received sound data.

A method of detecting voice data from sound data by voice input acceptance portion 114 can be exemplified by a method of detecting voice data by extracting a frequency band of voice uttered by a person (for example, a frequency band not lower than 100 Hz and not higher than 1 kHz) from sound data. In this case, voice input acceptance portion 114 desirably includes, for example, a band-pass filter or a filter obtained by combining a high-pass filter and a low-pass filter with each other in order to extract a frequency band of voice uttered by a person from sound data.

Voice input acceptance portion 114 outputs the voice data detected from the sound data to voice recognition portion 111 and transmits the same to server 20 through communication portion 101.

Voice recognition portion 111 recognizes a content of voice (a voice content) represented by voice data accepted by voice input acceptance portion 114 as a recognition content. Then, voice recognition portion 111 outputs a result of recognition of the voice content recognized from the voice data to response processing execution portion 112.

Though the description will be given later, voice recognition portion 111 can also calculate reliability indicating correctness (a degree of being correct) of recognition obtained as a result of recognition of a voice content (a result of voice recognition).

Though reliability being high can be defined, for example, by "0.6" or higher where a minimum value and a maximum value for recognition correctness are defined by "0" and "1", respectively, the present disclosure is not limited to these values.

As a method of determining reliability of a result of voice recognition by voice recognition portion 111, for example, a determination method prepared in advance, in which a matching score between a speech waveform model (an acoustic model) representing a plurality of prescribed words (phrases) and a waveform represented by voice data is determined and a highest matching score is adopted as reliability, can be employed. The present determination method is not limited as such, and for example, pattern matching can also be employed.

Response processing execution portion 112 determines a response content based on a result of recognition of a voice content by voice recognition portion 111. Specifically, response processing execution portion 112 determines a content of response to the voice content represented by voice data by referring to utterance content database 120 stored in storage portion 109. When response processing execution portion 112 determines the response content based on the result of recognition of the voice content by voice recognition portion 111, utterance to a user through speaker 104 is given by way of example based on the determined response content. Response processing execution portion 112 can utter to the user through speaker 104 by way of example based on voice recognition result data representing a result of voice recognition transmitted from server 20 through communication portion 101.

Operation mode switching portion 113 switches between a plurality of operation modes of cleaning robot 10. Switching between the operation modes will be described later.

A configuration of server 20 based on the present embodiment will now be described. Server 20 based on the present embodiment includes a communication portion 201, a control unit 202, and a storage portion 203.

Communication portion 201 carries out communication with the outside. Specifically, communication portion 201 communicates with cleaning robot 10 through network 5 such as the Internet. Any of wireless and wired communication is applicable.

Storage portion 203 is a storage device such as a random access memory (RAM) and a flash memory, and stores a program for realizing various functions of server 20. Storage portion 203 has an utterance content database 232 representing information on output of voice response and a state storage portion 233 storing a state of cleaning robot 10 by way of example.

Control unit 202 is mainly configured with a central processing unit (CPU) and realized as the CPU executes a program stored in storage portion 203.

Control unit 202 controls each portion of server 20 in a centralized manner. Specifically, control unit 202 outputs a result of voice recognition of voice data received from cleaning robot 10 through communication portion 201 to cleaning robot 10 through communication portion 201 as voice recognition result data.

A main functional configuration of control unit 202 of server 20 will now be described. Control unit 202 has a voice input reception portion 221, a voice recognition portion 222, and a response processing execution instruction portion 224.

Voice input reception portion 221 receives voice data transmitted from cleaning robot 10 through communication portion 201.

Voice recognition portion 222 recognizes a content of voice (a voice content) represented by the voice data received by voice input reception portion 221 as a recognition content. Then, voice recognition portion 222 outputs a result of recognition of the voice content recognized from the voice data to response processing execution instruction portion 224.

Though the description will be given later, voice recognition portion 222 can also calculate reliability indicating correctness (a degree of being correct) of recognition obtained as a result of recognition of a voice content (a result of voice recognition).

Though reliability being high can be defined, for example, by "0.6" or higher where a minimum value and a maximum value for reliability are defined by "0" and "1", respectively, the present disclosure is not limited to these values.

As a method of determining reliability of a result of voice recognition by voice recognition portion 222, for example, a determination method prepared in advance, in which a matching score between a speech waveform model (an acoustic model) representing a plurality of prescribed words (phrases) and a waveform represented by voice data is determined and a highest matching score is adopted as reliability, can be employed. The present determination method is not limited as such, and for example, pattern matching can also be employed.

Response processing execution instruction portion 224 determines a response content based on a result of recognition of the voice content by voice recognition portion 222. Specifically, response processing execution instruction portion 224 determines a content of response to the voice content represented by the voice data by referring to utterance content database 232 stored in storage portion 203. Details of the database stored in storage portion 203 will be described later.

When response processing execution instruction portion 224 determines the response content based on the result of recognition of the voice content by voice recognition portion 222, response content data representing the response content determined as the voice recognition result data which is a result of voice recognition is included and the response content data is transmitted to cleaning robot 10 through communication portion 201.

Response processing execution instruction portion 224 executes an instruction for switching between the plurality of operation modes of cleaning robot 10 as necessary. An instruction for switching between the operation modes will be described later.

(Utterance Content Database)

FIG. 3 is a diagram illustrating the utterance content database based on the present embodiment.

Referring to FIG. 3, utterance content database 120 is stored in storage portion 109 of cleaning robot 10 based on the present embodiment by way of example.

Specifically, in utterance content database 120 a recognition content (a recognition phrase) and a response content (an answer phrase) are registered in association with each other.

Here, for example, "I'm tired", "I'm sleepy", "I'm home", "I got a scolding today," and "I was in a fight today" are stored as recognition phrases in association with answer phrases. For example, an answer phrase "that's terrible" is registered in association with the recognition phrase "I'm tired".

A control command can also be registered as a recognition phrase. In the present example, by way of example, an answer phrase "start cleaning" is stored in association in correspondence with "clean up". Here, "start cleaning" means a command instructing cleaning robot 10 to start a cleaning function. Thus, cleaning robot 10 starts cleaning by cleaning portion 105.

When a plurality of answer phrases are prepared for the same recognition phrase, an answer phrase is randomly selected from among the plurality of answer phrases. Selection may be made based on priority. By providing a plurality of answer phrases, a patterned response content is avoided and smooth communication with a user can be achieved.

In the present example, utterance content databases 120 and 232 are provided in cleaning robot 10 and server 20, respectively. Voice recognition processing is performed in parallel in the devices and response processing is performed with an earlier result of voice recognition being prioritized. In the present example, by way of example, utterance content database 232 of server 20 includes at least information on utterance content database 120 of cleaning robot 10.

(Response Processing)

Figure 4:
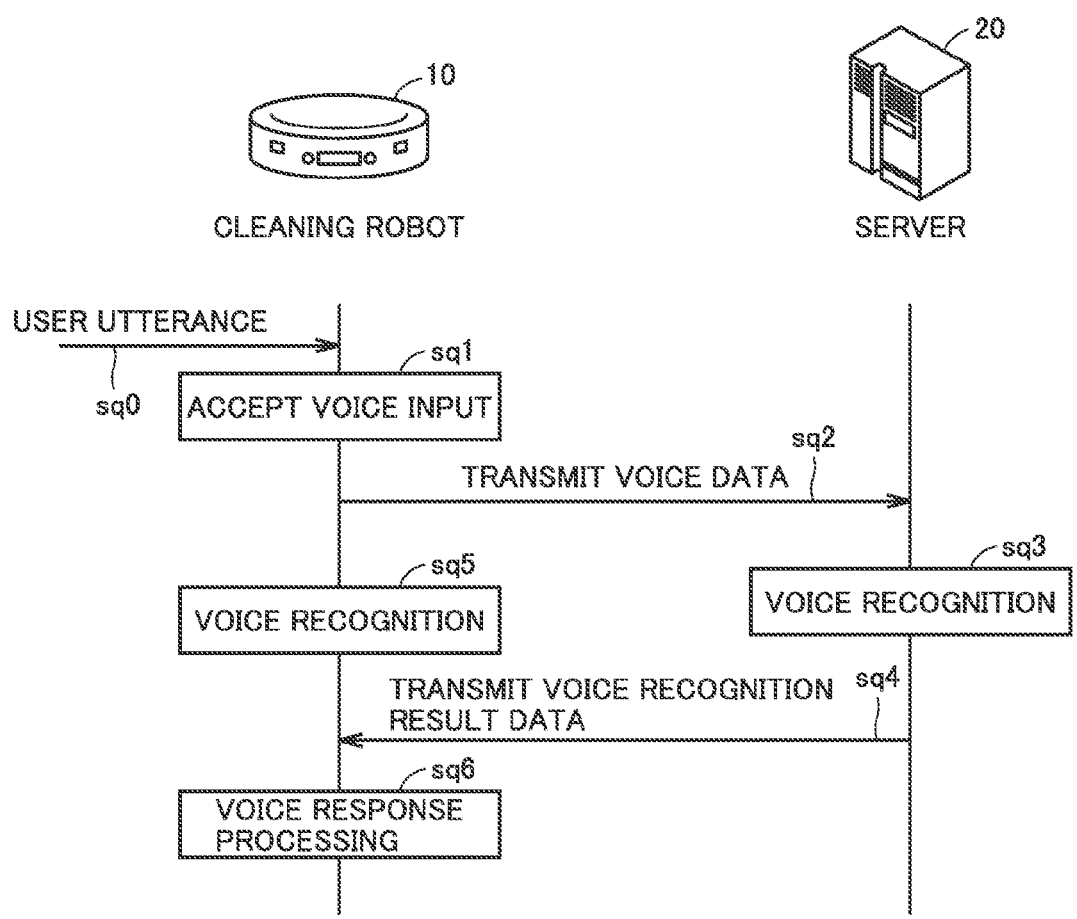
FIG. 4 is a sequence diagram showing a flow of response processing in voice recognition system 1 based on a first embodiment.

FIG. 4 is a sequence diagram showing a flow of response processing in voice recognition system 1 based on a first embodiment.

As shown in FIG. 4, the user utters to cleaning robot 10 (also referred to as user utterance) (sequence sq0).

Cleaning robot 10 accepts voice input of user utterance (sequence sq1). Specifically, voice input acceptance portion 114 accepts external sound input through microphone 103.

Then, cleaning robot 10 outputs voice data to server 20 (sequence sq2). Specifically, voice input acceptance portion 114 provides output to server 20 through communication portion 101.

Then, server 20 receives the voice data transmitted from cleaning robot 10 and carries out voice recognition (sequence sq3). Specifically, voice input reception portion 221 receives the voice data through communication portion 201 and outputs the voice data to voice recognition portion 222. Then, voice recognition portion 222 recognizes a voice content.

Then, server 20 transmits voice recognition result data resulting from voice recognition to cleaning robot 10 (sequence sq4). Specifically, voice recognition portion 222 outputs a result of recognition of the voice content to response processing execution instruction portion 224. Response processing execution instruction portion 224 determines a content of response to the voice content and transmits voice recognition result data including response content data representing the response content to cleaning robot 10 through communication portion 201.

Cleaning robot 10 carries out voice recognition of the voice data following sequence sq1 (sequence sq5). Specifically, voice recognition portion 111 recognizes the voice content in accordance with the voice data generated in voice input acceptance portion 114. Then, the result of recognition of the voice content is output to response processing execution portion 112.

Then, cleaning robot 10 performs voice response processing (sequence sq6).

Specifically, response processing execution portion 112 responds (utters) to the user through speaker 104 based on the result of recognition of the voice content output from voice recognition portion 111 or the voice recognition result data transmitted from server 20.

Namely, in the present first embodiment, cleaning robot 10 performs response processing based on the result of recognition of the voice content by voice recognition portion 111 or response processing based on the voice recognition result data which is a result of recognition of the voice content by voice recognition portion 222 of server 20, and in the present example, earlier response processing is preferentially performed.

Specifically, when the result of recognition of the voice content by voice recognition portion 111 is obtained earlier than the voice recognition result data transmitted from server 20, cleaning robot 10 performs response processing with the result of recognition of the voice content by voice recognition portion 111 being prioritized. When the voice recognition result data transmitted from server 20 is obtained earlier than the result of recognition of the voice content by voice recognition portion 111, response processing is performed with the voice recognition result data being prioritized. Redundant response processing can be avoided by not performing response processing for the later result of recognition.

According to such a configuration, in the present first embodiment, voice recognition is carried out in parallel in cleaning robot 10 and server 20, earlier processing is prioritized, and response processing is performed by using the earliest processing result. Therefore, voice recognition processing in the server is not performed after the result of voice recognition by cleaning robot 10, and the earliest voice recognition result resulting from voice recognition is made use of for response processing. Therefore, a time period for output of response from cleaning robot 10 is shortened, and smooth communication can be carried out without imposing stress to a user.

(Flowchart)

Figure 5:
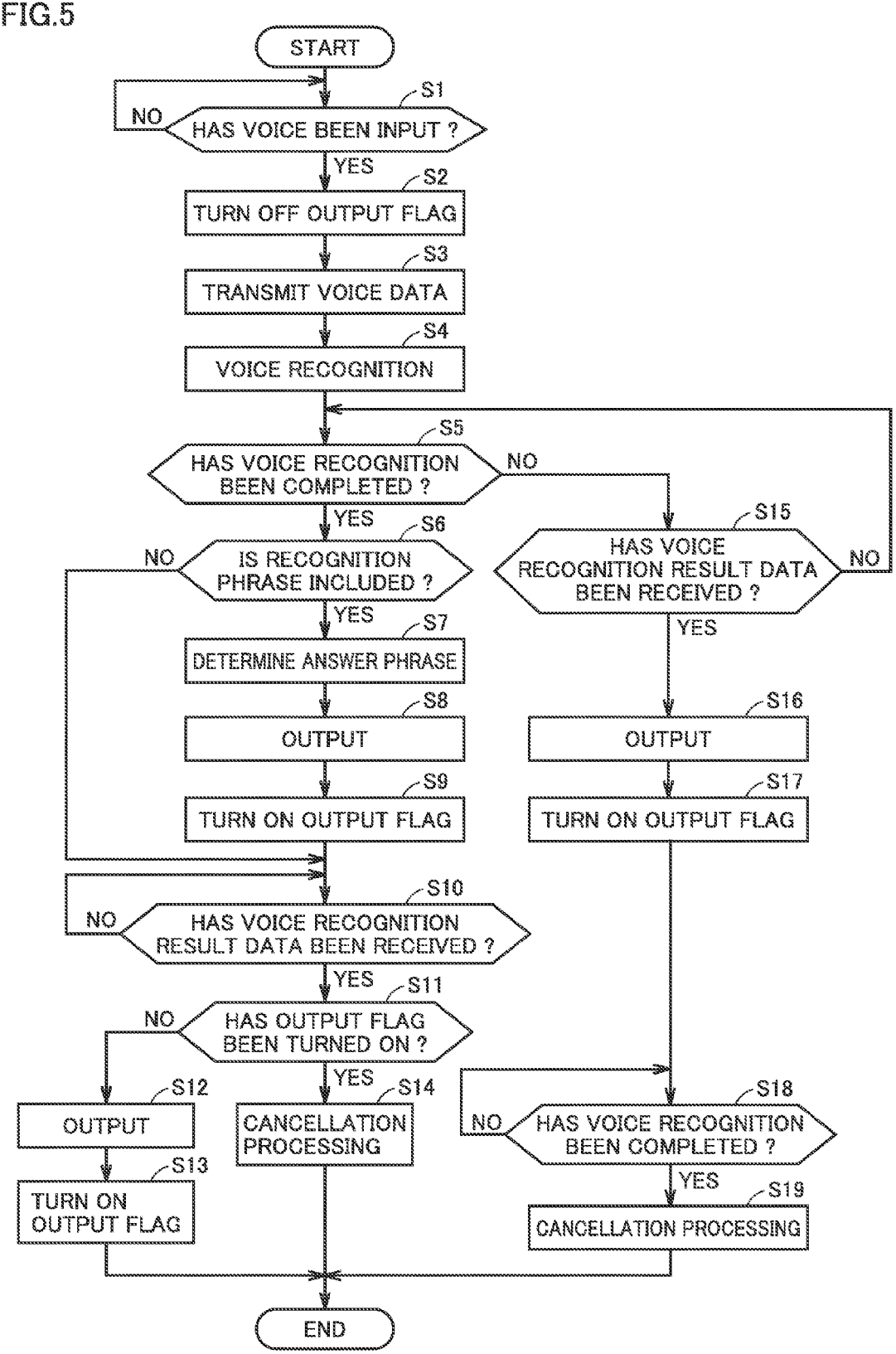
FIG. 5 is a flowchart for performing voice recognition processing by a cleaning robot 10 based on the present first embodiment.

FIG. 5 is a flowchart for execution of voice recognition processing by cleaning robot 10 based on the present first embodiment.

Referring to FIG. 5, the flowchart shows processing performed as a program stored in storage portion 109 is executed to function each portion in control unit 102.

Initially, control unit 102 determines whether or not voice input has been provided (step S1). Specifically, voice input acceptance portion 114 determines whether or not voice data has been detected through microphone 103.

In step S1, control unit 102 stands by until voice input is provided (NO in step S1), and when it is determined that voice input has been provided (YES in step S1), an output flag is set to off (step S2). Specifically, when it is determined that voice data has been detected, voice input acceptance portion 114 resets a flag value, which indicates that output processing has been performed. For example, when the flag value is "1", an initial value "0" is set. The output flag is data for avoiding redundant response processing from cleaning robot 10, and it is desirably stored in a prescribed area of storage portion 109.

Then, control unit 102 transmits voice data to server 20 (step S3). Specifically, voice input acceptance portion 114 transmits the detected voice data to server 20 through communication portion 101.

Then, control unit 102 carries out voice recognition (step S4). Specifically, voice recognition portion 111 recognizes a voice content of the voice data detected by voice input acceptance portion 114. Then, voice recognition portion 111 outputs a result of voice recognition to response processing execution portion 112 when voice recognition is completed.

Then, control unit 102 determines whether or not voice recognition has been completed (step S5). Specifically, response processing execution portion 112 determines whether or not output of a result of voice recognition has been received from voice recognition portion 111.

When control unit 102 determines in step S5 that voice recognition processing has been completed (YES in step S5), whether or not a recognition phrase is included is determined (step S6). Specifically, response processing execution portion 112 determines whether or not a recognition phrase in accordance with the result of voice recognition received from voice recognition portion 111 is included. Namely, whether or not a recognition phrase corresponding to a recognition content has been registered is determined by referring to utterance content database 120 (FIG. 3).

When control unit 102 determines in step S6 that a recognition phrase is included (YES in step S6), an answer phrase is determined (step S7). Specifically, response processing execution portion 112 determines an answer phrase corresponding to the recognition phrase by referring to utterance content database 120 (FIG. 3).

Then, control unit 102 performs output processing (step S8). Specifically, response processing execution portion 112 instructs speaker 104 to utter a response content of an answer phrase by way of example.

Then, control unit 102 sets an output flag to on (step S9). Specifically, response processing execution portion 112 sets the output flag stored in the prescribed area of storage portion 109 to "1" by way of example.

When control unit 102 determines in step S6 that no recognition phrase is included (NO in step S6), steps S7 to S9 are skipped and the process proceeds to step S10.

Then, control unit 102 determines whether or not the voice recognition result data has been received (step S10). Specifically, response processing execution portion 112 determines whether or not the voice recognition result data has been received from server 20 through communication portion 101.

In step S10, control unit 102 stands by until the voice recognition result data is received (NO in step S10), and when it is determined that the voice recognition result data has been received (YES in step S10), whether or not the output flag is on ("1") is then determined (step S11).

Specifically, when response processing execution portion 112 determines that the voice recognition result data from server 20 has been received, it checks the output flag stored in the prescribed area and determines whether or not the output flag is set to "1".

When control unit 102 determines in step S11 that the output flag is on ("1") (YES in step S11), cancellation processing is performed (step S14). Specifically, response processing execution portion 112 processes the voice recognition result data from server 20 as being invalid when the output flag is set to "1".

Then, control unit 102 ends the process (end). Namely, since the output flag has already been set to "1" through the cancellation processing and output processing has been completed, no redundant response processing can be performed.

When control unit 102 determines in step S11 that the output flag is not on ("1") (NO in step S11), the output processing is performed (step S12). Specifically, when the output flag is not set to "1", that is, set to "0", response processing execution portion 112 instructs speaker 104 to utter a response content of an answer phrase by way of example based on the response content data included in the voice recognition result data.

Then, control unit 102 sets the output flag to on ("1") (step S13). Specifically, response processing execution portion 112 sets the output flag stored in the prescribed area of storage portion 109 to "1" by way of example.

Then, control unit 102 ends the process (end).

When control unit 102 determines in step S5 that voice recognition processing has not been completed (NO in step S5), whether or not the voice recognition result data has been received is determined (step S15). Specifically, response processing execution portion 112 determines whether or not the voice recognition result data from server 20 has been received through communication portion 101.

When control unit 102 determines in step S15 that the voice recognition result data has been received (YES in step S15), the output processing is performed (step S16). Specifically, response processing execution portion 112 instructs speaker 104 to utter a response content of an answer phrase by way of example based on the response content data included in the voice recognition result data.

Then, control unit 102 sets the output flag to on ("1") (step S17). Specifically, response processing execution portion 112 sets the output flag stored in the prescribed area of storage portion 109 to "1" by way of example.

Then, control unit 102 determines whether or not voice recognition has been completed (step S18). Specifically, response processing execution portion 112 determines whether or not output of the result of voice recognition has been received from voice recognition portion 111.

In step S18, control unit 102 stands by until voice recognition is completed (NO in step S18), and when it determines that voice recognition has been completed (YES in step S18), it performs cancellation processing (step S19). Specifically, response processing execution portion 112 processes the output of the result of voice recognition from voice recognition portion 111 as being invalid.

Then, control unit 102 ends the process (end). Namely, since the output flag has already been set to "1" through the cancellation processing and output processing has been completed, no redundant response processing can be performed.

When control unit 102 determines in step S15 that the voice recognition result data has not been received (NO in step S15), the process returns to step S5 and whether or not voice recognition processing has been completed is determined (step S5). Subsequent processing is the same as described above.

Through the processing, cleaning robot 10 can perform response processing with a result of recognition of a voice content by voice recognition portion 111 being prioritized when a result of recognition of the voice content by voice recognition portion 111 is obtained earlier than the voice recognition result data transmitted from server 20, and can perform response processing with the voice recognition result data being prioritized when the voice recognition result data transmitted from server 20 is obtained earlier than the result of recognition of the voice content by voice recognition portion 111.

Though utterance based on a result of voice recognition by cleaning robot 10 has been described in the present example by way of example of response processing, limitation to utterance (voice response) is not intended and other response processing such as display or a running operation may be performed.

Though the process proceeds to step S10 without outputting anything from cleaning robot 10 when it is determined that no recognition phrase is included (NO in step S6) in the present example, in another aspect, cleaning robot 10 may utter stopgap voice such as "er" or perform other response processing until the voice recognition result data from server 20 is received. If response processing based on the voice recognition result data from server 20 is performed, it is expected that it takes longer than response processing based on a result of recognition of a voice content by cleaning robot 10. Therefore, by having cleaning robot 10 utter voice such as "er" or perform other response processing, uncomfortable feeling of a user is mitigated and affinity with cleaning robot 10 can be felt. Namely, smoother communication can be achieved. For example, while reception of voice recognition result data from server 20 is awaited in step S10 (NO in step S10), such response processing as utterance of such stopgap voice by cleaning robot 10 may be performed every certain period of time. Such response processing may be predetermined response, response processing may be selected from among several patterns, or response processing may randomly be selected.

Response processing such as utterance of stopgap voice is more preferably performed by cleaning robot 10 in terms of a response speed, however, a scheme in response to an instruction from server 20 can also be adopted. Specifically, such a configuration that when server 20 receives voice data from cleaning robot 10 in sequence sq12 in a sequence diagram in FIG. 13, server 20 instructs cleaning robot 10 to perform response processing such as utterance of stopgap voice may be adopted, which is also similarly applicable to an embodiment below.

Second Embodiment

In the first embodiment, a scheme for performing response processing based on any earlier recognition result of a result of recognition of a voice content by voice recognition portion 111 and voice recognition result data transmitted from server 20 has been described. In connection with voice recognition carried out by cleaning robot 10 and server 20, a result of voice recognition obtained from server 20 may be appropriate in terms of accuracy.

In the present second embodiment, appropriate response processing based on reliability indicating correctness (a degree of being correct) of recognition obtained as a result of voice recognition is performed. By way of example, reliability is represented by values from "0 to 1" and reliability can be higher as the value is closer to "1".

Figure 6:
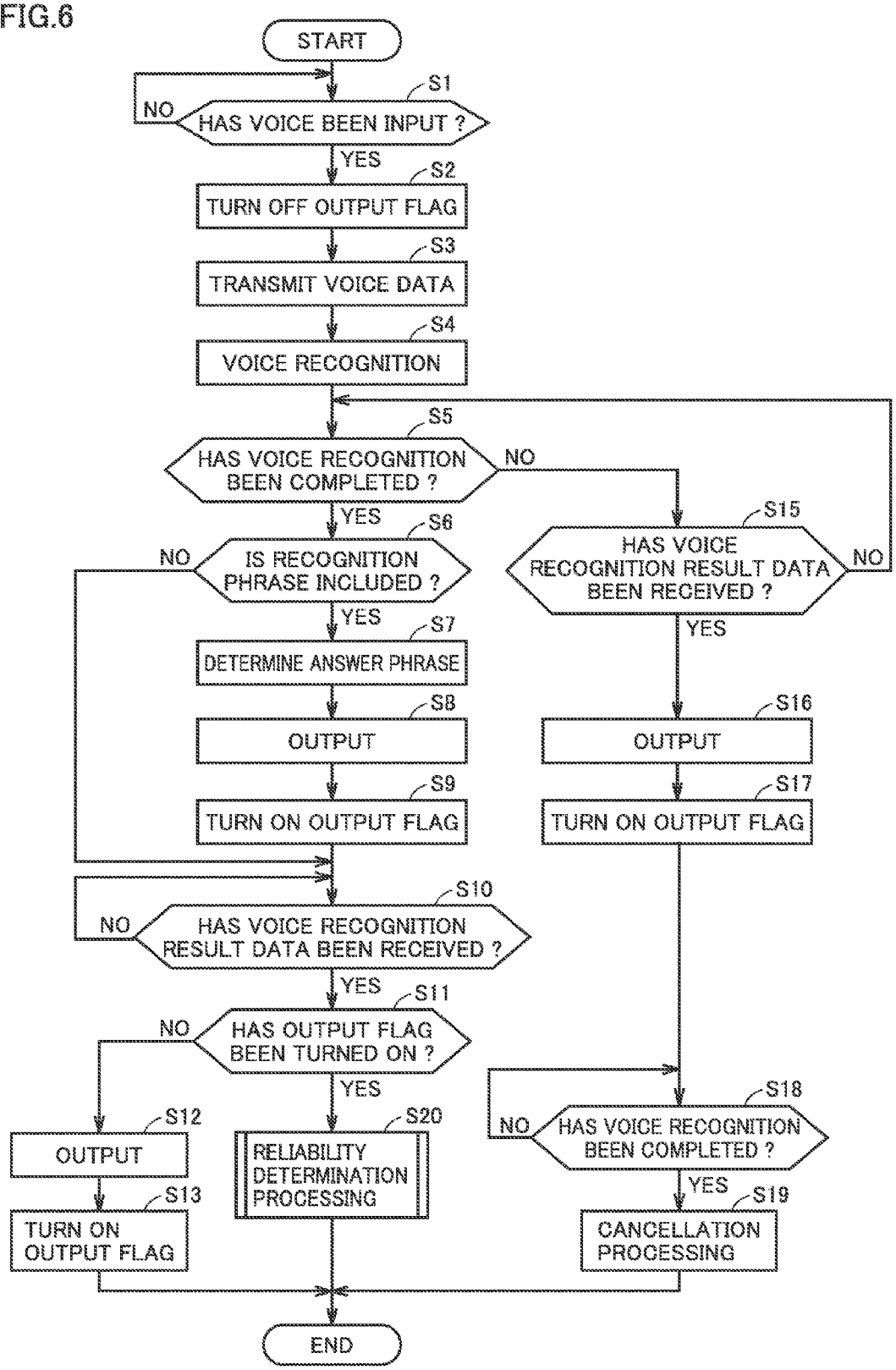
FIG. 6 is a flowchart for performing voice recognition processing by cleaning robot 10 based on the present second embodiment.

FIG. 6 is a flowchart for performing voice recognition processing by cleaning robot 10 based on the present second embodiment.

Referring to FIG. 6, the flowchart shows processing performed as a program stored in storage portion 109 is executed to function each portion in control unit 102.

Though the flowchart is different from the flowchart in FIG. 5 in that step S20 is provided instead of step S14, it is otherwise the same and therefore detailed description thereof will not be repeated.

When control unit 102 determines in step S11 that the output flag is on (YES in step S11), reliability determination processing is performed (step S20). Specifically, response processing execution portion 112 performs processing for determining recognition correctness (reliability) of voice recognition when the output flag is set to on ("1").

Figure 7:
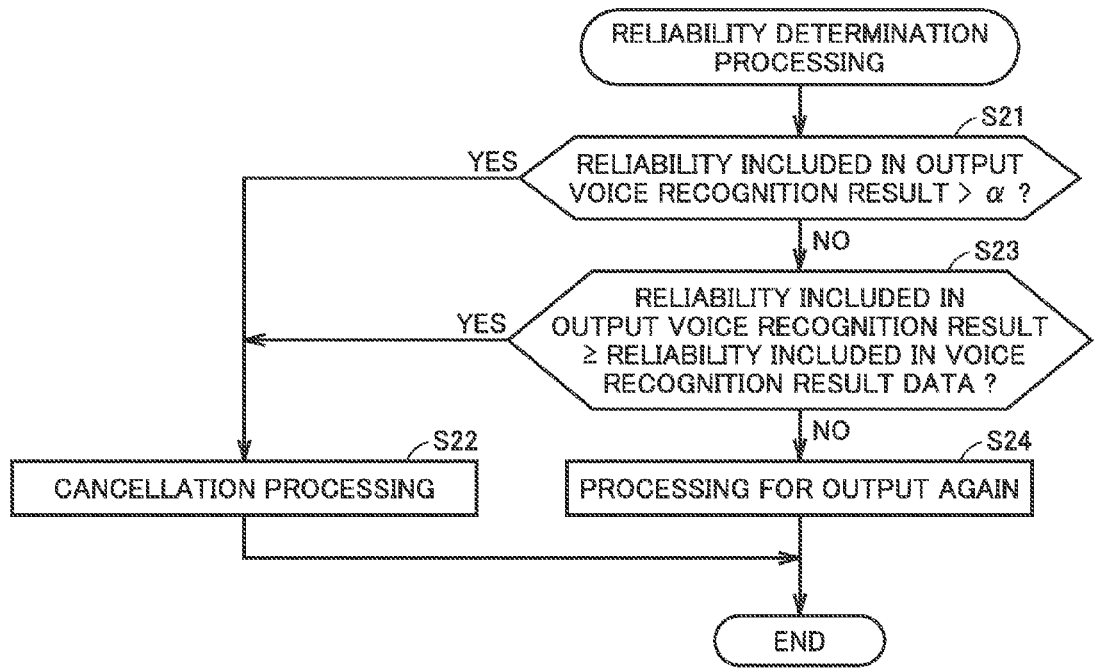
FIG. 7 is a flowchart illustrating reliability determination processing based on the present second embodiment.

FIG. 7 is a flowchart illustrating the reliability determination processing based on the present second embodiment. Referring to FIG. 7, the processing is performed by response processing execution portion 112.

Initially, response processing execution portion 112 determines whether or not reliability included in the output result of voice recognition is higher than a threshold value α (step S21). By way of example, threshold value α is set to "0.6". The threshold value is by way of example and another value can also naturally be set.

Then, when response processing execution portion 112 determines in step S21 that reliability included in the output result of voice recognition is higher than threshold value α (YES in step S21), cancellation processing is performed (step S22).

Then, response processing execution portion 112 ends the process (end). Specifically, when the output flag is set to "1" and reliability included in the output result of voice recognition is higher than threshold value α, response processing execution portion 112 processes the voice recognition result data from server 20 as being invalid.

When response processing execution portion 112 determines in step S21 that reliability included in the output result of voice recognition is not higher than threshold value α, that is, equal to or lower than threshold value α (NO in step S21), whether or not reliability included in the output result of voice recognition is equal to or higher than reliability included in the voice recognition result data is determined (step S23).

When response processing execution portion 112 determines in step S23 that reliability included in the output result of voice recognition is equal to or higher than reliability included in the voice recognition result data (YES in step S23), cancellation processing is performed (step S22).

Then, response processing execution portion 112 ends the process (end). Specifically, when the output flag is set to "1" and reliability included in the output result of voice recognition is equal to or lower than threshold value α and when reliability included in the output result of voice recognition is equal to or higher than reliability included in the voice recognition result data based on comparison between reliability included in the output result of voice recognition and reliability included in the voice recognition result data, response processing execution portion 112 processes the voice recognition result data from server 20 as being invalid.

When response processing execution portion 112 determines in step S23 that reliability included in the output result of voice recognition is lower than reliability included in the voice recognition result data (NO in step S23), processing for output again is performed (step S24). Specifically, by way of example, speaker 104 is instructed to utter a response content of an answer phrase based on response content data included in the voice recognition result data. Here, together with utterance indicating response again of "I repeat once again," the response content may be uttered from speaker 104.

Then, response processing execution portion 112 ends the process (end).

Through the processing, cleaning robot 10 performs processing for output again when reliability of the output result of voice recognition is low and reliability of later received voice recognition result data is higher. Thus, when the result of voice recognition obtained form server 20 is more appropriate in connection with voice recognition performed in cleaning robot 10 and server 20, processing for output again is performed, so that smooth communication can be carried out without imposing stress to a user.

Though processing for output again is performed when reliability of the output result of voice recognition is low and when reliability of later received voice recognition result data is higher in the present example, for example with step S21 in FIG. 7 being deleted, processing for output again may be performed when reliability of the later received voice recognition result data is higher than reliability of the output result of voice recognition.

Third Embodiment

In the first and second embodiments, voice recognition by cleaning robot 10 and server 20 is carried out in parallel, any earlier processing is prioritized, and response processing is performed by using a prioritized result.

Depending on a content of voice recognition, however, processing by server 20 may be appropriate.

In the present third embodiment, in a case that a normal mode and a server mode are available as operation modes of cleaning robot 10, the mode is switched.

The normal mode in the present example refers to a mode in which cleaning robot 10 and server 20 carry out voice recognition in parallel, any earlier processing is prioritized, and response processing is performed by using a prioritized result. In other words, it is a mode in which response processing is performed by selectively making use of a result, that is, an instruction, provided from server 20.

The server mode refers to a mode in which voice recognition by server 20 is prioritized and response processing is performed by using a result of voice recognition by server 20. In other words, it is a mode in which response processing is performed in accordance with a result, that is, an instruction, provided from server 20.

The normal mode is a mode making use of a function provided in advance in cleaning robot 10, and for example, use of a cleaning function or a normal utterance function is exemplified.

The server mode is a mode in which a function of cleaning robot 10 in the normal mode is expanded by making use of a function of server 20.

Cleaning robot 10 based on the present third embodiment can play a "last and first game" by way of example of a function of the server mode.

A dictionary made use of in the server mode for performing the processing will be described.

Figure 8:
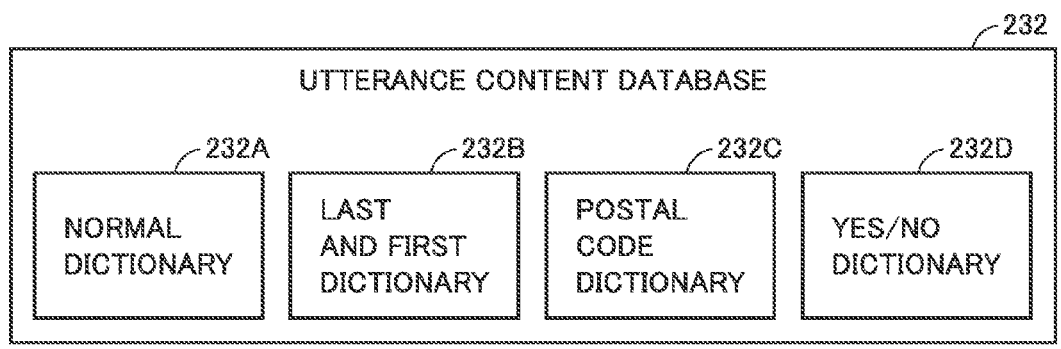
FIG. 8 is a diagram illustrating an utterance content database 232 based on the present third embodiment.

FIG. 8 is a diagram illustrating utterance content database 232 based on the present third embodiment.

Referring to FIG. 8, here, a plurality of voice recognition dictionaries made use of for a result of voice recognition are stored. Specifically, by way of example, a normal dictionary 232A, a last and first dictionary 232B, a postal code dictionary 232C, and a yes/no dictionary 232D are shown.

Switching between the dictionaries is made for each of the plurality of operation modes in connection with states of the cleaning robot.

FIG. 9 is a diagram illustrating the plurality of operation modes based on the present third embodiment.

Referring to FIG. 9, here, the normal mode and the server mode are provided. The server mode can further be divided into the server mode (last and first), the server mode (postal code), and the server mode (yes/no).

Specifically, in the normal mode, the cleaning robot uses the normal dictionary as the voice recognition dictionary.

In the normal dictionary, general phrases for operating the cleaning robot are registered and answer phrases or control phrases corresponding to the phrases are registered.

In the server mode (last and first), the last and first dictionary is used.

In the last and first dictionary, phrases for playing the last and first game and control phrases are registered. For example, in a case of last and first, "SUGAR" and "RICE" as the phrases and "End last and first" as the control phrase are registered.

In the server mode (postal code), the postal code dictionary is used. For example, "1", "2", and "3" as the phrases and "end of setting" as the control phrase are registered.

In the server mode (yes/no), the yes/no dictionary is used. For example, "yes" and "no" as the phrases and "end of setting" as the control phrase are registered.

Each dictionary will specifically be described.

(Normal Dictionary)

FIG. 10 is a diagram illustrating the normal dictionary based on the present third embodiment.

Referring to FIG. 10, a recognition content (a recognition phrase), a response content (an answer phrase), and a state are registered in association with one another.

By way of example, here, answer phrases are stored in association with recognition phrases "Let's play last and first," "Clean up", and "Today's weather".

For example, answer phrases "I start last and first. Sugar" and "Change to server mode" are registered in association, in correspondence with the recognition phrase "Let's play last and first." Then, the state server mode (last and first) is registered in association.

Here, "Change to server mode" means a command indicating change of the operation mode of cleaning robot 10 from the normal mode to the server mode.

The state server mode (last and first) means setting a state of cleaning robot 10 to the server mode (last and first) in server 20. By setting the state of cleaning robot 10, change to an appropriate voice recognition dictionary can be made when input of voice data from cleaning robot 10 is received.

The answer phrase "Start cleaning" is registered in association with the recognition phrase "Clean up".

Here, "Start cleaning" means a command instructing cleaning robot 10 to start a cleaning function. Thus, cleaning robot 10 starts cleaning by cleaning portion 105.

Answer phrases of two patterns are registered in association with the recognition phrase "Today's weather". Specifically, categorization into presence and absence of registration of a postal code is made. When a postal code has been registered (registered), weather information specified by the registered postal code is answered as the answer phrase. When a postal code has not been registered (not registered), "I initially set postal code. Say like one, zero, three" and "Change to server mode" are registered in association. Then, the state server mode (postal code) is registered in association.

The state server mode (postal code) means that a state of cleaning robot 10 is set to the server mode (postal code) in server 20. Though this aspect will be described later, by setting a state of the cleaning robot, change to an appropriate voice recognition dictionary can be made when input of voice data from cleaning robot 10 is received.

(Last and First Dictionary)

FIG. 11 is a diagram illustrating the last and first dictionary based on the present third embodiment.

Referring to FIG. 11, a recognition content (a recognition phrase), a response content (an answer phrase), and a state are registered in association with one another.

By way of example, here, the recognition phrases "Sugar", "Rice", "End last and first," and "Clean up" are stored in association with answer phrases.

For example, the recognition phrase "Sugar" is registered in association with answer phrases "Sugar. Rice". And the recognition phrase "Rice" is registered in association with answer phrase "Rice. East".

Answer phrases "I end last and first" and "Change to normal mode" are registered in association with the recognition phrase "End last and first." The state normal mode is registered in association.

Here, "Change to normal mode" means a command indicating change of the operation mode of cleaning robot 10 to the normal mode.

The state normal mode means setting a state of cleaning robot 10 to the normal mode in server 20. By setting a state of cleaning robot 10, change to an appropriate voice recognition dictionary can be made when input of voice data from cleaning robot 10 is received.

Answer phrases "Last and first has ended," "Start cleaning", and "Change to normal mode" are registered in association with the recognition phrase "Clean up". The state normal mode is registered in association.

Here, "Start cleaning" means a command instructing cleaning robot 10 to start a cleaning function. Thus, cleaning robot 10 starts cleaning by cleaning portion 105.

(State of Cleaning Robot)

Server 20 based on the present third embodiment stores information on a state of cleaning robot 10 in state storage portion 233.

FIG. 12 is a diagram illustrating information stored in state storage portion 233 based on the present third embodiment.

Referring to FIG. 12, here, a plurality of cleaning robots 10 are managed. Specifically, identification numbers are allocated to the plurality of cleaning robots 10, respectively. By way of example, ID1 to ID4 are allocated and registered as cleaning robot IDs, and information on "state of cleaning robot," "postal code", and "previous recognition time" is registered.

The "state of cleaning robot" is information on a mode for controlling the cleaning robot.

The "postal code" is information registered for specifying a geographical position of the cleaning robot, which will be described later.

The "previous recognition time" is a time stamp updated at the time when processing for responding to voice recognition is indicated, and it is information used for setting to an initial state when new voice data is input and when a prescribed period has elapsed since the previous recognition time.

For example, regarding the cleaning robot having "ID1", the "normal mode", "not yet set", and "2013/11/13 17:30:05" are set as the "state of cleaning robot," the "postal code", and the "previous recognition time," respectively.

Similarly, regarding the cleaning robot having "ID2", the "server mode (last and first)," "261-0013", and "2013/11/13 16:00:10" are set as the "state of cleaning robot," the "postal code", and the "previous recognition time," respectively.

Similarly, regarding the cleaning robot having "ID3", the "server mode (postal code)," "not yet set," and "2013/11/13 17:40:15" are set as the "state of cleaning robot," the "postal code", and the "previous recognition time," respectively.

Similarly, regarding the cleaning robot having "ID4", the "server mode (yes/no)," "not yet set," and "2013/11/13 17:20:14" are set as the "state of cleaning robot," the "postal code", and the "previous recognition time," respectively.

A flow of response processing in voice recognition system 1 based on the present third embodiment will be described below. Initially, play of the last and first game will be described.

(Last and First Game Start)

Figure 13:
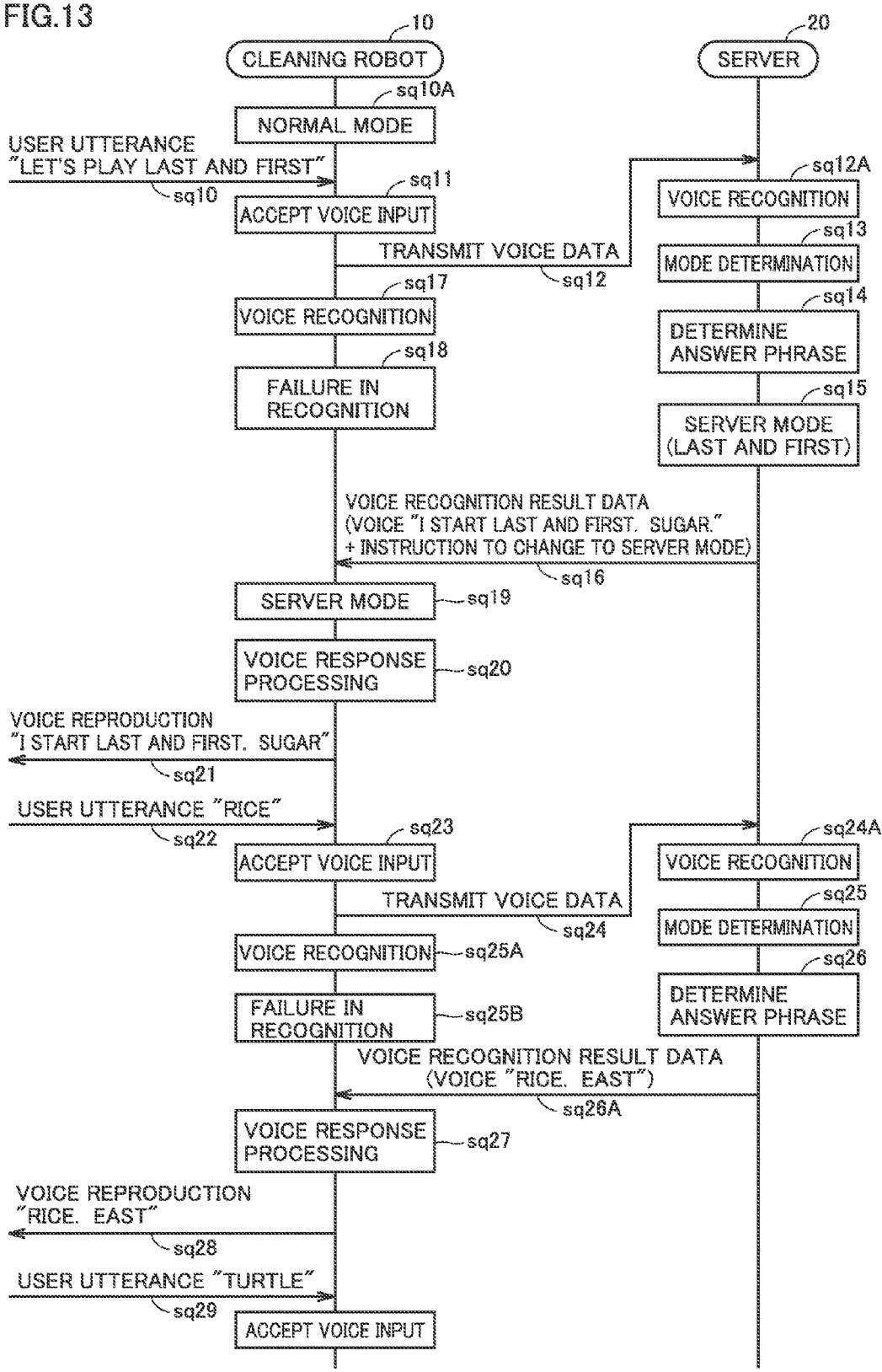
FIG. 13 is a sequence diagram showing a flow of response processing for last and first game start in voice recognition system 1 based on the third embodiment.

FIG. 13 is a sequence diagram showing a flow of response processing for last and first game start in voice recognition system 1 based on the third embodiment.

As shown in FIG. 13, initially, cleaning robot 10 is set to the normal mode (sequence sq10A).

Then, user utterance "Let's play last and first" is given (sequence sq10).

Then, cleaning robot 10 accepts voice input from the user (sequence sq11). Specifically, voice input acceptance portion 114 of cleaning robot 10 accepts input of sound from the outside through microphone 103.

Then, cleaning robot 10 outputs voice data to server 20 (sequence sq12). Specifically, voice input acceptance portion 114 provides an output to server 20 through communication portion 101.

Then, server 20 receives the voice data transmitted from cleaning robot 10 and carries out voice recognition (sequence sq12A). Specifically, voice recognition portion 222 obtains the recognition phrase "Let's play last and first." Then, voice recognition portion 222 outputs the result to response processing execution instruction portion 224.

Then, server 20 makes mode determination (sequence sq13. Specifically, response processing execution instruction portion 224 makes mode determination for determining a state of cleaning robot 10. Mode determination is processing for setting a voice recognition dictionary in accordance with a state of cleaning robot 10 stored in state storage portion 233.

For example, server 20 sets the voice recognition dictionary to the "normal dictionary" in a case of the cleaning robot having "ID 1" described with reference to FIG. 12 because the "state of cleaning robot" is the "normal mode". In the case of the cleaning robot having "ID2", the voice recognition dictionary is set to the "last and first dictionary" because the "state of cleaning robot" is the "server mode (last and first)." In the case of the cleaning robot having "ID3", the voice recognition dictionary is set to the "postal code dictionary" because the state of cleaning robot" is the "server mode (postal code)." In the case of the cleaning robot having "ID4", the voice recognition dictionary is set to the "yes/no dictionary" because the "state of cleaning robot" is the "server mode (yes/no)."

In the present example, server 20 sets the voice recognition dictionary to the "normal dictionary" in the case of the cleaning robot having "ID1", that is, in the "normal mode" by way of example.

Then, server 20 determines an answer phrase (sequence sq14).

Specifically, response processing execution instruction portion 224 determines a content for responding to a voice content which is a result obtained from voice recognition portion 222.

In the present example, for example, when the normal dictionary described with reference to FIG. 10 is used, the answer phrases "I start last and first. Sugar" and "Change to server mode" are determined as the response content in correspondence with the recognition phrase "Let's play last and first." In the present example, "I start last and first. Sugar" is an audio file by way of example. A file in a text format may be applicable, which is also the case with other examples.

Then, server 20 makes setting to the server mode (last and first) (sequence sq15).

Specifically, response processing execution instruction portion 224 sets the "state of cleaning robot" to the server mode (last and first) associated with the recognition phrase "Let's play last and first." Response processing execution instruction portion 224 changes the "state of cleaning robot" having "ID1" in state storage portion 233 to the "server mode (last and first)." Thus, an appropriate voice recognition dictionary (the last and first dictionary) to be made use of in next response can be made use of.

Then, server 20 transmits the voice recognition result data resulting from voice recognition to cleaning robot 10 (sequence sq16). Specifically, response processing execution instruction portion 224 transmits voice "I start last and first. Sugar" and an instruction to change to the server mode to cleaning robot 10 as the voice recognition result data through communication portion 201.

After sequence sq11, cleaning robot 10 carries out voice recognition of the voice data (sequence sq17). Specifically, voice recognition portion 111 recognizes a voice content in accordance with the voice data generated by voice input acceptance portion 114. Then, voice recognition portion 111 outputs a result of recognition of the voice content to response processing execution portion 112.

Then, cleaning robot 10 fails in recognition (sequence sq18). Since no answer phrase corresponding to the recognition phrase "Let's play last and first" is provided in utterance content database 120 of cleaning robot 10 in the present example, recognition has failed.

Then, cleaning robot 10 sets the state of the cleaning robot to the server mode (sequence sq19). Specifically, operation mode switching portion 113 changes the normal mode to the server mode based on the voice recognition result data transmitted from server 20 ("instruction to change to the server mode)).

Cleaning robot 10 performs voice response processing based on the voice recognition result data transmitted from server 20 (sequence sq20). Specifically, response processing execution portion 112 reproduces an audio file of the voice recognition result data ("I start last and first. Sugar"). Namely, cleaning robot 10 responds (utters) with voice ("I start last and first. Sugar") through speaker 104 to the user (sequence sq21).

Then, user utterance "Rice" is given based on a rule of last and first (sequence sq22).

Then, cleaning robot 10 accepts voice input voice from the user (sequence sq23). Specifically, voice input acceptance portion 114 of cleaning robot 10 accepts input of sound from the outside through microphone 103.

Then, cleaning robot 10 outputs voice data to server 20 (sequence sq24). Specifically, voice input acceptance portion 114 provides an output to server 20 through communication portion 101.

Then, server 20 receives the voice data transmitted from cleaning robot 10 and carries out voice recognition (sequence sq24A). Specifically, voice recognition portion 222 obtains the recognition phrase "Rice". Then, voice recognition portion 222 outputs the result to response processing execution instruction portion 224.

Then, server 20 makes mode determination (sequence sq25). Specifically, response processing execution instruction portion 224 makes mode determination for determining a state of cleaning robot 10. Mode determination is processing for setting to a dictionary in accordance with a state in accordance with a state of cleaning robot 10 stored in state storage portion 233. In the present example, through sequence sq15, the "state of cleaning robot" having "ID1" in state storage portion 233 of server 20 has been changed to the "server mode (last and first)." Thus, the voice recognition dictionary has been set to the "last and first dictionary."

Then, server 20 determines an answer phrase (sequence sq26). Specifically, response processing execution instruction portion 224 determines a content of response to the voice content. In the present example, for example, when the last and first dictionary described with reference to FIG. 11 is used, the answer phrase "Sugar. Rice" is determined as the response content in correspondence with the recognition phrase "Sugar".

Then, server 20 transmits the voice recognition result data resulting from voice recognition to cleaning robot 10 (sequence sq26A). Specifically, response processing execution instruction portion 224 transmits an audio file ("Rice. East") as the voice recognition result data to cleaning robot 10 through communication portion 201.

After sequence sq24, cleaning robot 10 carries out voice recognition of the voice data (sequence sq25A). Specifically, voice recognition portion 111 recognizes a voice content in accordance with the voice data generated by voice input acceptance portion 114. Then, voice recognition portion 111 outputs the result of recognition of the voice content to response processing execution portion 112.

Then, cleaning robot 10 fails in recognition (sequence sq25B). Since cleaning robot 10 in the present example is not provided with an answer phrase corresponding to the recognition phrase "Rice", recognition has failed.

Then, cleaning robot 10 performs voice response processing based on the voice recognition result data transmitted from server 20 (sequence sq27). Specifically, response processing execution portion 112 reproduces an audio file of the voice recognition result data ("Rice. East"). Namely, cleaning robot 10 responds (utters) with voice ("Rice. East") to the user through speaker 104 (sequence sq28).

Then, user utterance "Turtle" is given based on the rule of last and first (sequence sq29). Subsequently, the last and first game can be played in accordance with similar processing.

Therefore, according to such a configuration, when a function such as the "last and first game" is provided only in server 20, the state of cleaning robot 10 is switched from the normal mode to the server mode so as to make use of the function of server 20. Thus, a function of cleaning robot 10 in the normal mode can be expanded. By prioritizing voice recognition by server 20, a response time for output from cleaning robot 10 is shortened and smooth communication can be carried out without imposing stress to the user.

Though setting of the state of cleaning robot 10 is changed from the normal mode to the server mode based on a result of voice recognition resulting from voice recognition of a voice content uttered by a user in the present example, the state does not particularly have to be changed based on the result of voice recognition and the state can also be changed by other means. Specifically, by providing an operation input for switching to the server mode to an operation portion (not shown) of cleaning robot 10, cleaning robot 10 is changed from the normal mode to the server mode and server 20 is notified of switching to the server mode. Thus, the state of the cleaning robot described with reference to FIG. 12 can be changed to the server mode. Instead of inputting an instruction for change to the server mode to cleaning robot 10, a prescribed direction is given to server 20 so that change from the normal mode to the server mode can also be indicated. Then, an instruction to change to the server mode may be transmitted from server 20 to cleaning robot 10 for switching from the normal mode to the server mode, which is also applicable to an embodiment below.

(Last and First Game End (No. 1))

Figure 14:
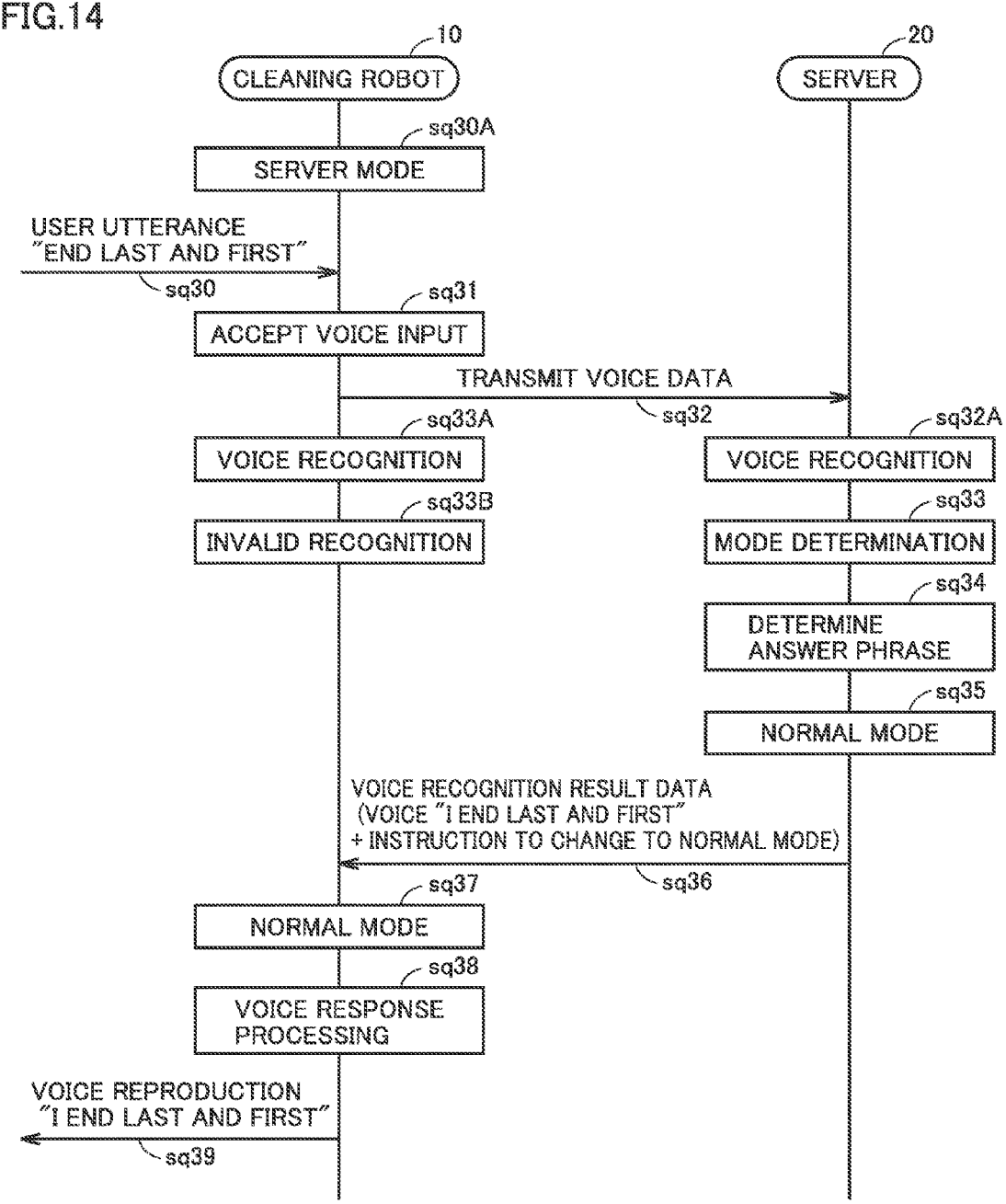
FIG. 14 is a sequence diagram showing a flow of response processing (No. 1) for last and first game end in voice recognition system 1 based on the third embodiment.

FIG. 14 is a sequence diagram showing a flow of response processing (No. 1) for last and first game end in voice recognition system 1 based on the third embodiment.

As shown in FIG. 14, initially, cleaning robot 10 is set to the server mode (sequence sq30A).

Then, user utterance "End last and first" is given (sequence sq30).

Then, cleaning robot 10 accepts voice input from the user (sequence sq31). Specifically, voice input acceptance portion 114 of cleaning robot 10 accepts input of sound from the outside through microphone 103.

Then, cleaning robot 10 outputs voice data to server 20 (sequence sq32). Specifically, voice input acceptance portion 114 provides an output to server 20 through communication portion 101.

Then, server 20 receives the voice data transmitted from cleaning robot 10 and carries out voice recognition (sequence sq32A). Specifically, voice recognition portion 222 obtains the recognition phrase "End last and first." Then, voice recognition portion 222 outputs the result to response processing execution instruction portion 224.

Then, server 20 makes mode determination (sequence sq33). Specifically, response processing execution instruction portion 224 makes mode determination for determining a state of cleaning robot 10. Mode determination is processing for setting a dictionary in accordance with a state in accordance with a state of cleaning robot 10 stored in state storage portion 233. In the present example, through sequence sq15, the "state of cleaning robot" having "ID1" in state storage portion 233 of server 20 has been changed to the "server mode (last and first)." Thus, server 20 has set the voice recognition dictionary to the "last and first dictionary."

Then, server 20 determines an answer phrase (sequence sq34). Specifically, response processing execution instruction portion 224 determines a content of response to the voice content which is a result obtained from voice recognition portion 222.

In the present example, for example, when the last and first dictionary described with reference to FIG. 11 is used, the answer phrases "I end last and first" and "Change to normal mode" are determined as response contents in correspondence with the recognition phrase "End last and first."

Then, server 20 sets the state of the cleaning robot to the normal mode (sequence sq35). Specifically, response processing execution instruction portion 224 sets the "state of cleaning robot" associated with the recognition phrase "End last and first" to the normal mode. Specifically, the "state of cleaning robot" having "ID1" in state storage portion 233 is changed to the "normal mode". Thus, an appropriate voice recognition dictionary (the normal dictionary) to be made use of in next response can be made use of.

Then, server 20 transmits the voice recognition result data resulting from voice recognition to cleaning robot 10 (sequence sq36). Specifically, response processing execution instruction portion 224 transmits voice "I end last and first" and an instruction to change to the normal mode to cleaning robot 10 as the voice recognition result data through communication portion 201.

After sequence sq32, cleaning robot 10 carries out voice recognition of the voice data (sequence sq33A). Specifically, voice recognition portion 111 recognizes a voice content in accordance with the voice data generated by voice input acceptance portion 114. Then, a result of recognition of the voice content is output to response processing execution portion 112.

Then, cleaning robot 10 invalidates recognition (sequence sq33B). Cleaning robot 10 in the present example prioritizes an instruction from server 20 in the server mode and invalidates a result of voice recognition by cleaning robot 10.

Then, cleaning robot 10 sets the state of the cleaning robot to the normal mode (sequence sq37). Specifically, operation mode switching portion 113 changes the server mode to the normal mode based on the voice recognition result data transmitted from server 20 ("instruction to change to normal mode").

Cleaning robot 10 performs voice response processing based on the voice recognition result data transmitted from server 20 (sequence sq38). Specifically, response processing execution portion 112 reproduces an audio file of the voice recognition result data ("I end last and first"). Namely, cleaning robot 10 responds (utters) with voice ("I end last and first") to the user through speaker 104 (sequence sq39).

Thus, the last and first game can end.

Though voice recognition of a voice content uttered by a user is carried out and setting of the state of cleaning robot 10 is changed from the server mode to the normal mode based on a result of voice recognition in the present example, the state does not particularly have to be changed based on the result of voice recognition and the state can also be changed by other means. Specifically, by providing an operation input for switching to the normal mode to an operation portion (not shown) of cleaning robot 10, cleaning robot 10 is changed from the server mode to the normal mode and server 20 is notified of switching to the normal mode. Thus, the state of the cleaning robot described with reference to FIG. 12 can be changed to the normal mode. Instead of inputting an instruction for change to the normal mode to cleaning robot 10, a prescribed direction is given to server 20 so that change from the server mode to the normal mode can also be indicated. Then, an instruction to change to the normal mode may be transmitted from server 20 to cleaning robot 10 for switching from the server mode to the normal mode, which is also applicable to an embodiment below.

(Last and First Game End (No. 2))

Here, no voice recognition has been carried out for a prescribed period of time (5 minutes by way of example) since start of the last and first game. User utterance is given after lapse of the prescribed period of time or longer.

Figure 15:
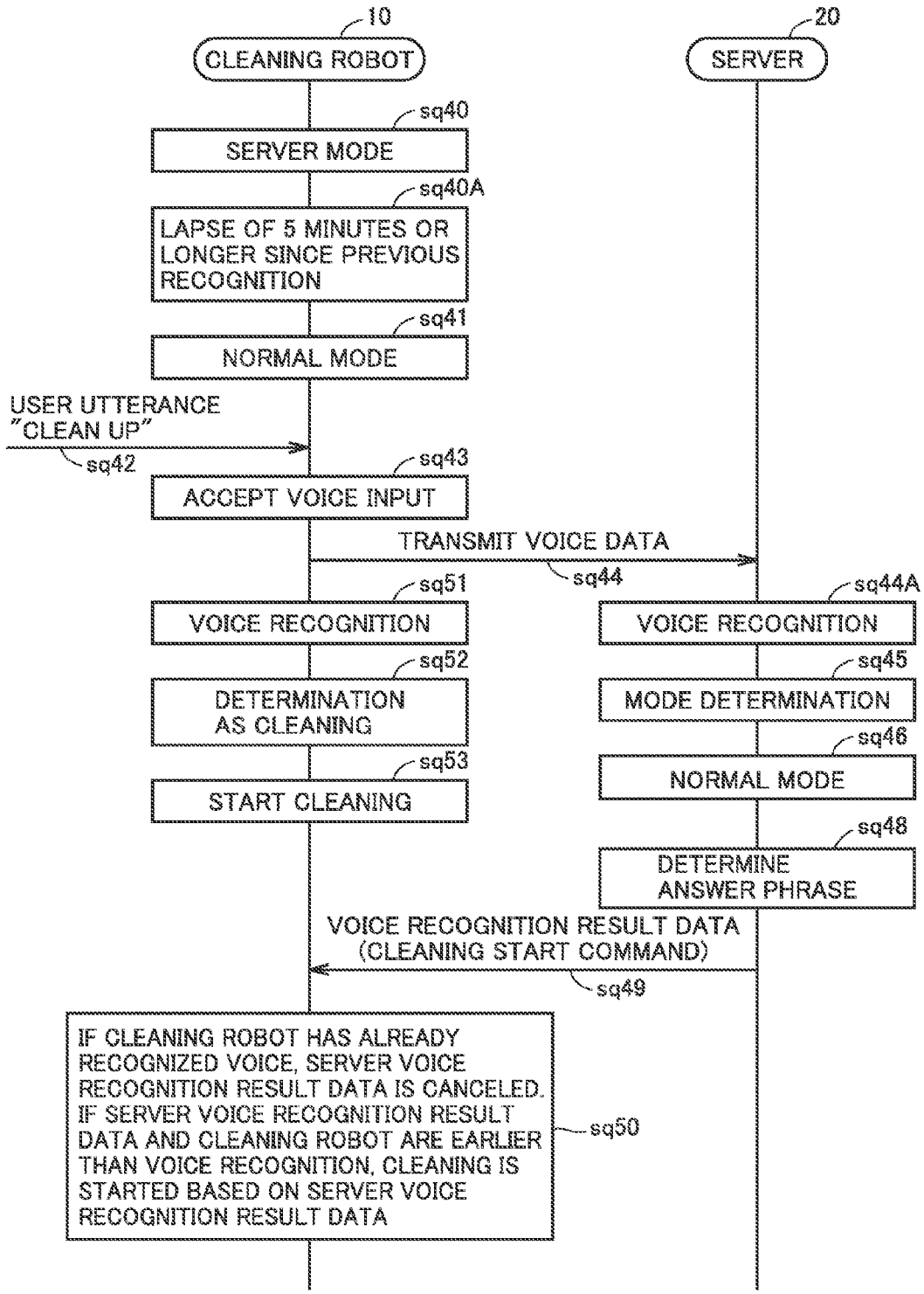
FIG. 15 is a sequence diagram showing a flow of response processing (No. 2) for last and first game end in voice recognition system 1 based on the third embodiment.

FIG. 15 is a sequence diagram showing a flow of response processing (No. 2) for last and first game end in voice recognition system 1 based on the third embodiment.

As shown in FIG. 15, initially, cleaning robot 10 is set to the server mode (sequence sq40).

Then, 5 minutes or longer have elapsed since previous recognition (sequence sq40A).

Then, cleaning robot 10 changes from the server mode to the normal mode because 5 minutes or longer have elapsed since previous recognition (sequence sq41).

Then, the user gives user utterance "Clean up" to cleaning robot 10 (sequence sq42).

Then, cleaning robot 10 accepts voice input from the user (sequence sq43). Specifically, voice input acceptance portion 114 of cleaning robot 10 accepts input of sound from the outside through microphone 103.

Then, cleaning robot 10 outputs voice data to server 20 (sequence sq44). Specifically, voice input acceptance portion 114 provides an output to server 20 through communication portion 101.

Then, server 20 receives the voice data transmitted from cleaning robot 10 and carries out voice recognition (sequence sq44A). Specifically, voice recognition portion 222 obtains the recognition phrase "Clean up". Then, voice recognition portion 222 outputs the result to response processing execution instruction portion 224.

Then, server 20 makes mode determination (sequence sq45). Specifically, response processing execution instruction portion 224 makes mode determination for determining a state of cleaning robot 10. Mode determination is processing for setting to a voice recognition dictionary in accordance with a state in accordance with a state of cleaning robot 10 stored in state storage portion 233.

In the present example, 5 minutes or longer have elapsed since previous recognition. In mode determination, the previous recognition time stored in state storage portion 233 is referred to. Whether or not a prescribed period of time has elapsed is determined based on comparison between the current voice recognition time and the previous recognition time, and when it is determined that the prescribed period of time has elapsed, reset to the initial state (the normal mode) is made.

Thus, server 20 sets the state of the cleaning robot to the normal mode (sequence sq46). Namely, the "normal dictionary" is set as the voice recognition dictionary. Specifically, response processing execution instruction portion 224 changes the "state of cleaning robot" having "ID1" in state storage portion 233 to the "normal mode".

Then, server 20 determines an answer phrase (sequence sq48). Specifically, response processing execution instruction portion 224 determines a content of response to the voice content which is a result obtained from voice recognition portion 222.

In the present example, for example, when the normal dictionary described with reference to FIG. 10 is used, the answer phrase "Start cleaning" is determined as the response content in correspondence with the recognition phrase "Clean up".

Then, server 20 transmits the voice recognition result data resulting from voice recognition to cleaning robot 10 (sequence sq49). Specifically, response processing execution instruction portion 224 transmits a cleaning start instruction command as the voice recognition result data to cleaning robot 10 through communication portion 201.

Cleaning robot 10 carries out voice recognition of the voice data after sequence sq44 (sequence sq51). Specifically, voice recognition portion 111 recognizes the voice content in accordance with the voice data generated by voice input acceptance portion 114. Then, voice recognition portion 111 outputs the result of recognition of the voice content to response processing execution portion 112.

Then, cleaning robot 10 makes determination as execution of a cleaning function (sequence sq52).

In the present example, for example, when the utterance content database described with reference to FIG. 3 is used, the answer phrase "Start cleaning" is determined as the response content in correspondence with the recognition phrase "Clean up".

Then, cleaning robot 10 starts cleaning (sequence sq53). Specifically, response processing execution portion 112 instructs cleaning portion 105 to perform a cleaning function in response to the answer phrase "Start cleaning".

When cleaning robot 10 has already carried out voice recognition, the voice recognition result data from server 20 is canceled. If the voice recognition result data from server 20 is earlier than voice recognition by cleaning robot 10, cleaning is started based on the voice recognition result data from server 20 (a cleaning start instruction command) (sequence sq50).

Therefore, when no voice recognition has been carried out for a prescribed period of time (5 minutes by way of example) or longer since start of the last and first game, reset to the normal mode is made so that the last and first game can end.

When cleaning robot 10 obtains the result of recognition of a voice content by voice recognition portion 111 earlier than the voice recognition result data transmitted from server 20 in the normal mode, response processing (the cleaning function) is performed with the result of recognition of the voice content by voice recognition portion 111 being prioritized. When the voice recognition result data transmitted from server 20 is obtained earlier than the result of recognition of the voice content by voice recognition portion 111, response processing (the cleaning function) is performed with the voice recognition result data being prioritized. Execution of redundant response processing (the cleaning function) can be avoided by not performing processing for response to a later result of recognition.

(Last and First Game End (No. 3))

Here, end of the last and first game in the middle of the last and first game will be described.

Figure 16:
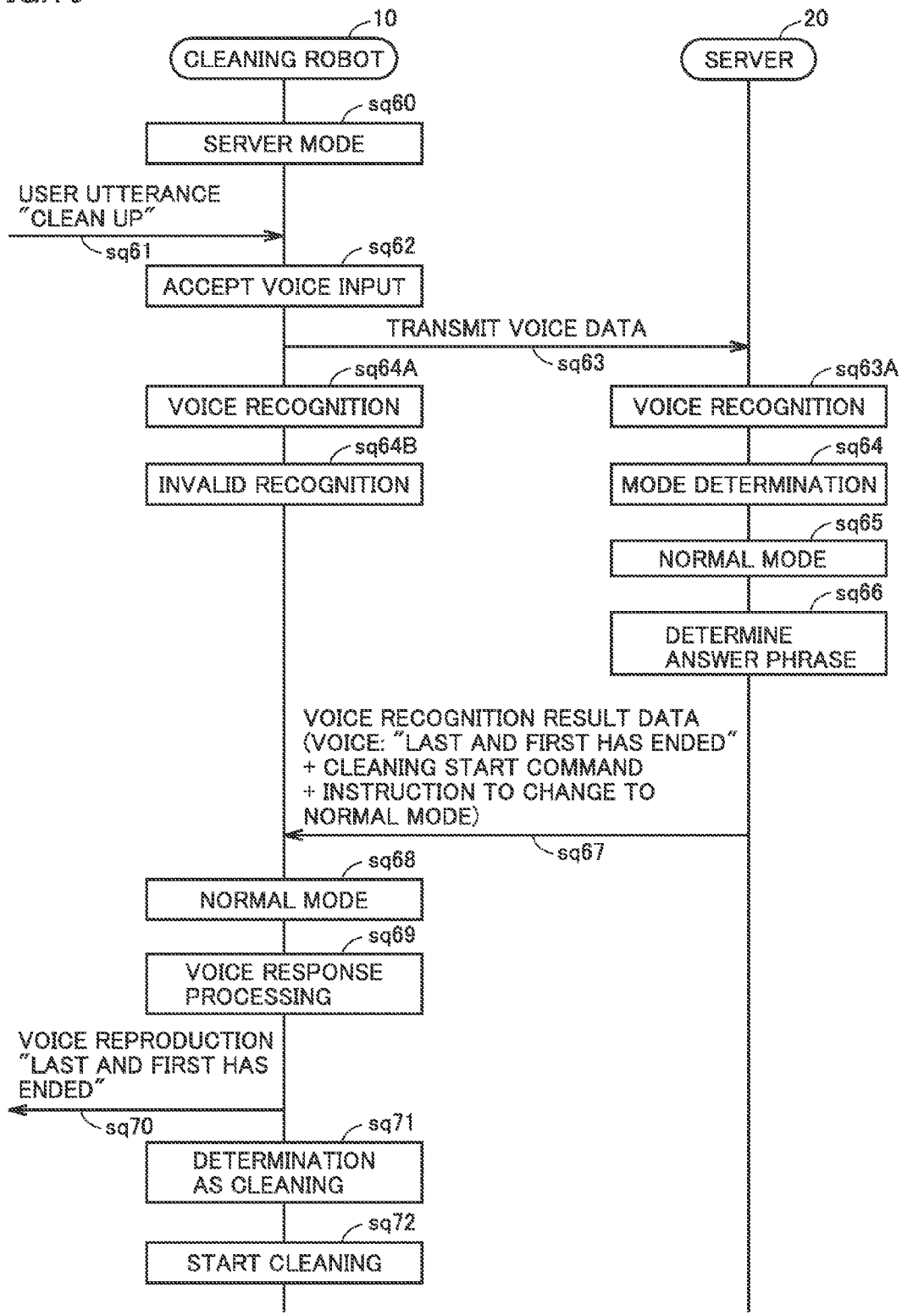
FIG. 16 is a sequence diagram showing a flow of response processing (No. 3) for last and first game end in voice recognition system 1 based on the third embodiment.

FIG. 16 is a sequence diagram showing a flow of response processing (No. 3) for last and first game end in voice recognition system 1 based on the third embodiment.

As shown in FIG. 16, initially, cleaning robot 10 is set to the server mode (sequence sq60).

Then, the user gives user utterance "Clean up" (sequence sq61).

Then, cleaning robot 10 accepts voice input from the user (sequence sq62). Specifically, voice input acceptance portion 114 of cleaning robot 10 accepts input of sound from the outside through microphone 103.

Then, cleaning robot 10 outputs voice data to server 20 (sequence sq63). Specifically, voice input acceptance portion 114 provides an output to server 20 through communication portion 101.

Then, server 20 receives the voice data transmitted from cleaning robot 10 and carries out voice recognition (sequence sq63A). Specifically, voice recognition portion 222 obtains the recognition phrase "Clean up". Then, voice recognition portion 222 outputs the result to response processing execution instruction portion 224.

Then, server 20 makes mode determination (sequence sq64). Specifically, response processing execution instruction portion 224 makes mode determination for determining a state of cleaning robot 10. Mode determination is processing for setting to a voice recognition dictionary in accordance with a state in accordance with a state of cleaning robot 10 stored in state storage portion 233. In the present example, through sequence sq15, the "state of cleaning robot" having "ID1" in state storage portion 233 of server 20 has been set to the "server mode (last and first)." Thus, server 20 has set the voice recognition dictionary to the "last and first dictionary."

Then, server 20 determines an answer phrase (sequence sq65). Specifically, response processing execution instruction portion 224 determines a content of response to the voice content which is a result obtained from voice recognition portion 222.

In the present example, for example, when the last and first dictionary described with reference to FIG. 11 is used, the answer phrases "Last and first has ended," "Start cleaning", and "Change to the normal mode" are determined as response contents in correspondence with the recognition phrase "Clean up".

Then, server 20 sets the state of the cleaning robot to the normal mode (sequence sq66).

Response processing execution instruction portion 224 changes the "state of cleaning robot" associated with the recognition phrase "Clean up" to the normal mode. Thus, an appropriate voice recognition dictionary (the normal dictionary) to be made use of in next response can be made use of.

Then, server 20 transmits the voice recognition result data resulting from voice recognition to cleaning robot 10 (sequence sq67). Specifically, response processing execution instruction portion 224 transmits voice "Last and first has ended," a cleaning start instruction command, and an instruction to change to the normal mode as the voice recognition result data to cleaning robot 10 through communication portion 201.

After sequence sq63, cleaning robot 10 carries out voice recognition of the voice data (sequence sq64A). Specifically, voice recognition portion 111 recognizes a voice content in accordance with the voice data generated by voice input acceptance portion 114. Then, voice recognition portion 111 outputs a result of recognition of the voice content to response processing execution portion 112.

Then, cleaning robot 10 fails recognition (sequence sq64B). Cleaning robot 10 in the present example prioritizes an instruction from server 20 in the server mode and invalidates a result of voice recognition by cleaning robot 10.

Then, cleaning robot 10 makes setting to the normal mode (sequence sq68). Specifically, operation mode switching portion 113 changes the server mode to the normal mode based on the voice recognition result data transmitted from server 20 ("instruction to change to normal mode").

Cleaning robot 10 performs voice response processing based on the voice recognition result data transmitted from server 20 (sequence sq69). Specifically, response processing execution portion 112 reproduces an audio file of the voice recognition result data ("Last and first has ended"). Namely, response (utterance) of voice ("Last and first has ended") is given to the user through speaker 104 (sequence sq70).

Then, cleaning robot 10 makes determination as execution of a cleaning function (sequence sq71). Response processing execution portion 112 makes determination as execution of the cleaning function based on the voice recognition result data (the cleaning start instruction command).

Then, cleaning robot 10 starts cleaning (sequence sq72). Specifically, response processing execution portion 112 instructs cleaning portion 105 to perform the cleaning function in response to the answer phrase "start cleaning".

Therefore, after the last and first game is started, the last and first game can end in response to prescribed user utterance.

(Flowchart)

Figure 17:
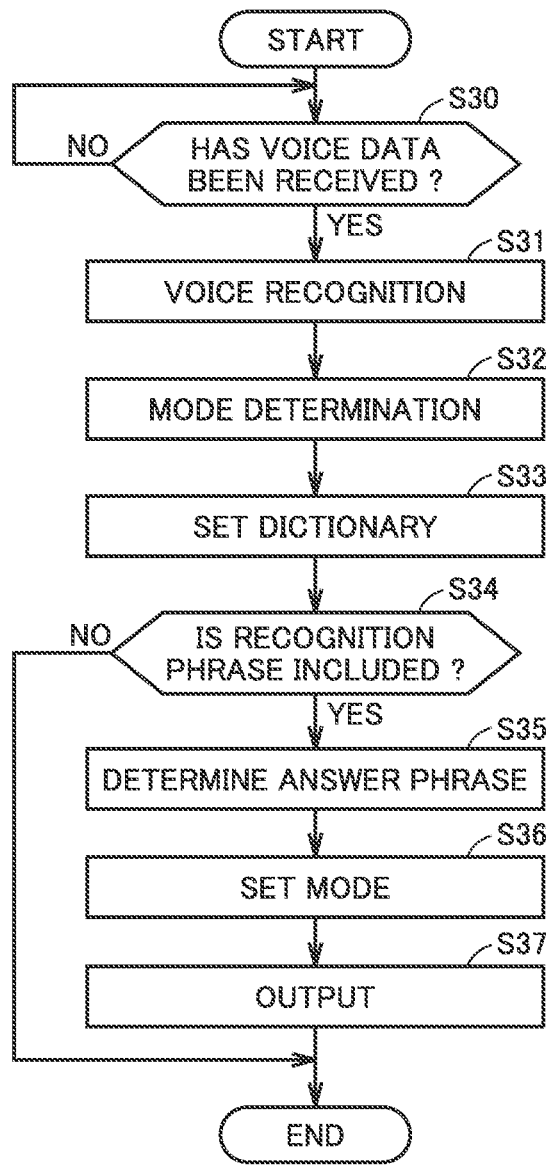
FIG. 17 is a flowchart for performing voice recognition processing by a server 20 based on the present third embodiment.

FIG. 17 is a flowchart for execution of voice recognition processing by server 20 based on the present third embodiment.

Referring to FIG. 17, the flowchart shows processing performed as a program stored in storage portion 203 is executed to function each portion in control unit 202.

Initially, control unit 202 determines whether or not voice data has been received (step S30). Specifically, voice input reception portion 221 determines whether or not the voice data has been received.

In step S30, control unit 202 stands by until the voice data is received (NO in step S30), and when it is determined that the voice data has been received (YES in step S30), voice recognition is carried out (step S31). Specifically, voice recognition portion 222 recognizes a voice content in accordance with the voice data received by voice input reception portion 221. Then, a result of recognition of the voice content is output to response processing execution instruction portion 224.

Then, control unit 202 makes mode determination (step S32). Specifically, response processing execution instruction portion 224 checks the state of cleaning robot 10 in state storage portion 233, which is stored in storage portion 203 of server 20 as described with reference to FIG. 12. Whether or not a prescribed period of time has elapsed since previous recognition is determined, and when it is determined that the prescribed period of time has elapsed, reset to the initial state (the normal mode) is made.

Then, control unit 202 sets a voice recognition dictionary in accordance with the obtained mode (the state) (step S33). Specifically, response processing execution instruction portion 224 sets a voice recognition dictionary for determining a response content.

Then, control unit 202 determines whether or not a recognition phrase is included (step S34). Specifically, response processing execution instruction portion 224 determines whether or not a recognition phrase recognized by voice recognition portion 222 is included in the set voice recognition dictionary.

When control unit 202 determines in step S34 that a recognition phrase is included (YES in step S34), it determines an answer phrase (step S35). Specifically, when response processing execution instruction portion 224 determines that a recognition phrase recognized by voice recognition portion 222 is included in the set voice recognition dictionary, it determines an answer phrase corresponding to the recognition phrase.

Then, control unit 202 sets the mode (step S36). Specifically, response processing execution instruction portion 224 updates the mode in state storage portion 233 as necessary when the mode corresponding to the recognition phrase is set.

Then, control unit 202 performs output processing (step S37). Specifically, response processing execution instruction portion 224 transmits the determined answer phrase as voice recognition result data to cleaning robot 10 through communication portion 201. The previous recognition time of the state of cleaning robot 10 in state storage portion 233 is updated.

Then, control unit 202 ends the process (end).

When control unit 202 determines in step S34 that no recognition phrase is included (NO in step S34), steps S35 to S37 are skipped and the process ends (end). Specifically, when response processing execution instruction portion 224 determines that no recognition phrase recognized by voice recognition portion 222 is included in the set voice recognition dictionary, the process ends as recognition has failed.

Though play of the "last and first game" has been described as a case of switching to the server mode in the present example, limitation to the "last and first game" is not particularly intended and any processing is applicable so long as the processing preferentially makes use of a function of server 20.

Fourth Embodiment

Switching between the plurality of operation modes in connection with the state of cleaning robot 10 has been described in the third embodiment. In the present fourth embodiment, a further expanded function will be described.

In the present example, by way of example, cleaning robot 10 utters with weather information being obtained.

Specifically, the voice recognition dictionaries (the postal code dictionary and the yes/no dictionary) in the server mode (postal code) and the server mode (yes/no) are made use of.

(Postal Code Dictionary)

FIG. 18 is a diagram illustrating the postal code dictionary and the yes/no dictionary based on the present fourth embodiment.

Referring to FIG. 18 (A), in the postal code dictionary, a recognition content (a recognition phrase), a response content (an answer phrase), and a state are registered in association with one another.

By way of example, here, answer phrases are stored in association with recognition phrases "Two, six, one" and "End of setting."

For example, an answer phrase "Is XXX correct? Answer with yes or no." is registered in association with the recognition phrase "Two, six, one." The state server mode (yes/no) is registered in association. "XXX" means a content similar to the recognition phrase.

The state server mode "yes/no" means setting of the state of cleaning robot 10 to the server mode (yes/no) in server 20. By setting the state of cleaning robot 10, server 20 can change to an appropriate voice recognition dictionary when input of voice data from cleaning robot 10 is received.

An answer phrase "I end setting" is registered in association with the recognition phrase "End of setting."

The state normal mode means setting of the state of cleaning robot 10 to the normal mode in server 20.

(Yes/No Dictionary)

Referring to FIG. 18 (B), a recognition content (a recognition phrase), a response content (an answer phrase), and a state are registered in association in the yes/no dictionary.

By way of example, here, answer phrases are stored in association with recognition phrases "Yes", "No", and "End of setting."

For example, answer phrases "I have registered YYY," "weather information", and "Change to normal mode" are registered in association with the recognition phrase "Yes". The state normal mode is registered in association. "YYY" means a content similar to the content of the registered postal code.

Here, "Change to normal mode" means a command indicating change of the operation mode of cleaning robot 10 to the normal mode.

The state normal mode means setting of the state of cleaning robot 10 to the normal mode in server 20. By setting the state of cleaning robot 10, change to an appropriate voice recognition dictionary can be made when input of voice data from cleaning robot 10 is received.

An answer phrase "Say once again" is registered in association with the recognition phrase "No".

The state server mode (postal code) means setting of the state of cleaning robot 10 to the server mode (postal code) in server 20. By setting the state of cleaning robot 10, change to an appropriate voice recognition dictionary can be made when input of voice data from cleaning robot 10 is received.

An answer phrase "I end setting" is registered in association with the recognition phrase "End of setting."

The state normal mode means setting of the state of cleaning robot 10 to the normal mode in server 20. By setting the state of cleaning robot 10, change to an appropriate voice recognition dictionary can be made when input of voice data from cleaning robot 10 is received.

(Obtainment of Weather Information)

FIG. 19 is a sequence diagram showing a flow of response processing in obtaining weather information (No. 1) in voice recognition system 1 based on the fourth embodiment.

As shown in FIG. 19, initially, cleaning robot 10 is set to the normal mode (sequence sq80).

Then, the user gives user utterance "Today's weather" (sequence sq81).

Then, cleaning robot 10 accepts voice input from the user (sequence sq82). Specifically, voice input acceptance portion 114 of cleaning robot 10 accepts input of sound from the outside through microphone 103.

Then, cleaning robot 10 outputs voice data to server 20 (sequence sq83). Specifically, voice input acceptance portion 114 provides an output to server 20 through communication portion 101.

Then, server 20 receives the voice data transmitted from cleaning robot 10 and carries out voice recognition (sequence sq83A). Specifically, voice recognition portion 222 obtains the recognition phrase "Today's weather". Then, voice recognition portion 222 outputs the result to response processing execution instruction portion 224.

Then, server 20 makes mode determination (sequence sq84). Specifically, response processing execution instruction portion 224 makes mode determination for determining a state of cleaning robot 10. Mode determination is processing for setting to a voice recognition dictionary in accordance with a state in accordance with a state of cleaning robot 10 stored in state storage portion 233. In the present example, server 20 makes setting to the "normal dictionary" in the case of the cleaning robot having "ID1", that is, in the "normal mode" by way of example.

Then, server 20 confirms absence of registration (sequence sq86). Specifically, response processing execution instruction portion 224 determines a content of response to a voice content which is a result obtained from voice recognition portion 222.

In the present example, for example, when the normal dictionary described with reference to FIG. 10 is used, two patterns are provided as answer phrases, in correspondence with the recognition phrase "Today's weather". Specifically, categorization into presence of registration of a postal code (registered: weather information" and absence of registration of a postal code (not registered: I initially set postal code. Say like one, zero, three.) is made.

Therefore, response processing execution instruction portion 224 checks whether or not a postal code for cleaning robot 10 stored in state storage portion 233 has been set. Then, in the present example, response processing execution instruction portion 224 confirms "not yet set," that is, not registered, by way of example.

Then, server 20 determines an answer phrase (sequence sq86A).

Specifically, for example, when the normal dictionary described with reference to FIG. 10 is used, response processing execution instruction portion 224 determines as a content of response, the answer phrases "I initially set postal code. Say like one, zero, three" and "Change to server mode" in correspondence with absence of registration of the recognition phrase "Today's weather".

Then, server 20 sets the state of the cleaning robot to the server mode (postal code) (sequence sq87). Specifically, response processing execution instruction portion 224 sets the "state of cleaning robot" associated with the recognition phrase "Today's weather" to the server mode (postal code). By way of example, response processing execution instruction portion 224 changes the "state of cleaning robot" having "ID1" in state storage portion 233 to the "server mode (postal code)." Thus, server 20 can make use of an appropriate voice recognition dictionary (the postal code dictionary) to be made use of in next response.

Then, server 20 transmits the voice recognition result data resulting from voice recognition to cleaning robot 10 (sequence sq90). Specifically, response processing execution instruction portion 224 transmits voice "I initially set postal code. Say like one, zero, three" and an instruction to change to the server mode as the voice recognition result data to cleaning robot 10 through communication portion 201.

After sequence sq83, cleaning robot 10 carries out voice recognition of the voice data (sequence sq88). Specifically, voice recognition portion 111 recognizes a voice content in accordance with the voice data generated by voice input acceptance portion 114. Then, voice recognition portion 111 outputs a result of recognition of the voice content to response processing execution portion 112.

Then, cleaning robot 10 fails in recognition (sequence sq89). Since no answer phrase corresponding to the recognition phrase "Today's weather" is provided in utterance content database 120 of cleaning robot 10 in the present example, recognition has failed.

Then, cleaning robot 10 sets the mode to the server mode (sequence sq91). Specifically, operation mode switching portion 113 changes the normal mode to the server mode based on the voice recognition result data transmitted from server 20 ("instruction to change to server mode").

Cleaning robot 10 performs voice response processing based on the voice recognition result data transmitted from server 20 (sequence sq92). Specifically, response processing execution portion 112 reproduces an audio file of the voice recognition result data ("I initially set postal code. Say like one, zero, three."). Namely, response (utterance) with voice ("I initially set postal code. Say like one, zero, three.") is given to the user through speaker 104 (sequence sq93).

Then, user utterance "Two, six, one" is given based on a scheme for setting a postal code (sequence sq94).

Then, cleaning robot 10 accepts voice input from the user (sequence sq95). Specifically, voice input acceptance portion 114 of cleaning robot 10 accepts input of sound from the outside through microphone 103.

Then, cleaning robot 10 outputs voice data to server 20 (sequence sq96). Specifically, voice input acceptance portion 114 provides an output to server 20 through communication portion 101.

Then, server 20 receives the voice data transmitted from cleaning robot 10 and carries out voice recognition (sequence sq96A). Specifically, voice recognition portion 222 obtains the recognition phrase "Two, six, one." Then, voice recognition portion 222 outputs the result to response processing execution instruction portion 224.

Then, server 20 makes mode determination (sequence sq97). Specifically, response processing execution instruction portion 224 makes mode determination for determining a state of cleaning robot 10. Mode determination is processing for setting a dictionary in accordance with a state in accordance with a state of cleaning robot 10 stored in state storage portion 233. In the present example, through sequence sq87, the "state of cleaning robot" having "ID1" in state storage portion 233 of server 20 has been changed to the "server mode (postal code)." Thus, server 20 has set the voice recognition dictionary to the "postal code dictionary."

Then, server 20 determines an answer phrase (sequence sq97A).

Specifically, response processing execution instruction portion 224 determines a content of response to the voice content which is a result obtained from voice recognition portion 222.

In the present example, for example, when the postal code dictionary described with reference to FIG. 18 (A) is used, server 20 determines the answer phrase "Is XXX correct? Answer with yes or no." as a response content in correspondence with the recognition phrase "Two, six, one."

Then, server 20 makes setting to the server mode (yes/no) (sequence sq98).

Specifically, response processing execution instruction portion 224 changes the "state of cleaning robot" associated with the recognition phrase "Two, six, one" to the "server mode (yes/no)." Response processing execution instruction portion 224 changes the "state of cleaning robot" having "ID1" in state storage portion 233 to the "server mode (yes/no)" by way of example. Thus, server 20 can make use of an appropriate voice recognition dictionary (the yes/no dictionary) to be made use of in next response.

Then, server 20 transmits the voice recognition result data resulting from voice recognition to cleaning robot 10 (sequence sq101). Specifically, response processing execution instruction portion 224 transmits voice "Is two, six, one correct? Answer with yes or no." as the voice recognition result data to cleaning robot 10 through communication portion 201.

After sequence sq96, cleaning robot 10 carries out voice recognition of the voice data (sequence sq99). Specifically, voice recognition portion 111 recognizes a voice content in accordance with the voice data generated by voice input acceptance portion 114. Then, voice recognition portion 111 outputs a result of recognition of the voice content to response processing execution portion 112.

Then, cleaning robot 10 invalidates recognition (sequence sq100). Cleaning robot 10 in the present example prioritizes an instruction from server 20 in the server mode and invalidates a result of voice recognition by cleaning robot 10.

Then, cleaning robot 10 performs voice response processing based on the voice recognition result data transmitted from server 20 (sequence sq102). Specifically, response processing execution portion 112 reproduces an audio file of the voice recognition result data ("Is two, six, one correct? Answer with yes or no."). Namely, response (utterance) with voice ("Is two, six, one correct? Answer with yes or no.") is given to the user through speaker 104 (sequence sq103).

Then, user utterance "Yes" is given based on an answer rule of yes and no (sequence sq104).

Then, cleaning robot 10 accepts voice input from the user (sequence sq105). Specifically, voice input acceptance portion 114 of cleaning robot 10 accepts input of sound from the outside through microphone 103.

Then, cleaning robot 10 outputs voice data to server 20 (sequence sq106). Specifically, voice input acceptance portion 114 provides an output to server 20 through communication portion 101.

Then, server 20 receives the voice data transmitted from cleaning robot 10 and carries out voice recognition (sequence sq106A). Specifically, voice recognition portion 222 obtains the recognition phrase "Yes". Then, voice recognition portion 222 outputs the result to response processing execution instruction portion 224.

Then, mode determination is made (sequence sq107). Specifically, response processing execution instruction portion 224 makes mode determination for determining a state of cleaning robot 10. Mode determination is processing for setting a dictionary in accordance with a state in accordance with a state of cleaning robot 10 stored in state storage portion 233. In the present example, through sequence sq98, the "state of cleaning robot" having "ID1" in state storage portion 233 of server 20 has been changed to the "server mode (yes/no)." Thus, server 20 has set the voice recognition dictionary to the "yes/no dictionary".

Then, server 20 makes setting and registration (sequence sq108). Specifically, response processing execution instruction portion 224 makes setting and registration of a voice content which is a result obtained from voice recognition portion 222 as a postal code. Specifically, server 20 registers the obtained result about the "postal code" as the state of the cleaning robot which is stored in state storage portion 233.

Then, server 20 obtains weather information (sequence sq109). Specifically, response processing execution instruction portion 224 obtains weather information in accordance with the set and registered postal code. In this regard, server 20 transmits information on the set and registered postal code to a known external server which can obtain weather information and obtains weather information associated with the postal code and transmitted from the external server.

Then, server 20 determines an answer phrase (sequence sq109A).

Specifically, response processing execution instruction portion 224 determines a content of response to a voice content which is a result obtained from voice recognition portion 222. In the present example, for example, when the yes/no dictionary described with reference to FIG. 18 (B) is used, answer phrases "I have registered YYY," "weather information", and "Change to normal mode" are determined as the response contents in correspondence with the recognition phrase "Yes". "YYY" is "Two, six, one." "Weather information" is "It is ZZZ today." "ZZZ" is information on weather obtained from the external server, such as "fine", "rainy", and "cloudy". Information on a temperature or chance of rain may be included.

Then, server 20 makes setting to the normal mode (sequence sq110).

Specifically, response processing execution instruction portion 224 sets the "state of cleaning robot" associated with the recognition phrase "Yes" to the normal mode. Response processing execution portion instruction portion 224 changes the "state of cleaning robot" having "ID1" in state storage portion 233 to the "normal mode". Thus, server 20 can make use of an appropriate voice recognition dictionary (the normal dictionary) to be made use of in next response.

Then, server 20 transmits the voice recognition result data resulting from voice recognition to cleaning robot 10 (sequence sq113). Specifically, response processing execution instruction portion 224 transmits voice "Two, six, one has been registered. It is fine today." and an instruction to change to the normal mode as the voice recognition result data to cleaning robot 10 through communication portion 201.

After sequence sq106, cleaning robot 10 carries out voice recognition of the voice data (sequence sq111). Specifically, voice recognition portion 111 recognizes a voice content in accordance with the voice data generated by voice input acceptance portion 114. Then, voice recognition portion 111 outputs a result of recognition of the voice content to response processing execution portion 112.

Then, cleaning robot 10 invalidates recognition (sequence sq112). Cleaning robot 10 in the present example prioritizes an instruction from server 20 in the server mode and invalidates a result of voice recognition by cleaning robot 10.

Then, cleaning robot 10 makes setting to the normal mode (sequence sq114). Specifically, operation mode switching portion 113 changes the server mode to the normal mode based on the voice recognition result data transmitted from server 20 ("instruction to change to normal mode").

Then, cleaning robot 10 performs voice response processing based on the voice recognition result data transmitted from server 20 (sequence sq115). Specifically, response processing execution portion 112 reproduces an audio file of the voice recognition result data ("Two, six, one has been registered. It is fine today"). Namely, cleaning robot 10 responds (utters) with voice ("Two, six, one has been registered. It is fine today") to the user through speaker 104 (sequence sq116).

Thus, the postal code is set, weather information corresponding to the postal code is obtained, and utterance can be given.

(Obtainment of Weather Information (No. 2))

Figure 20:
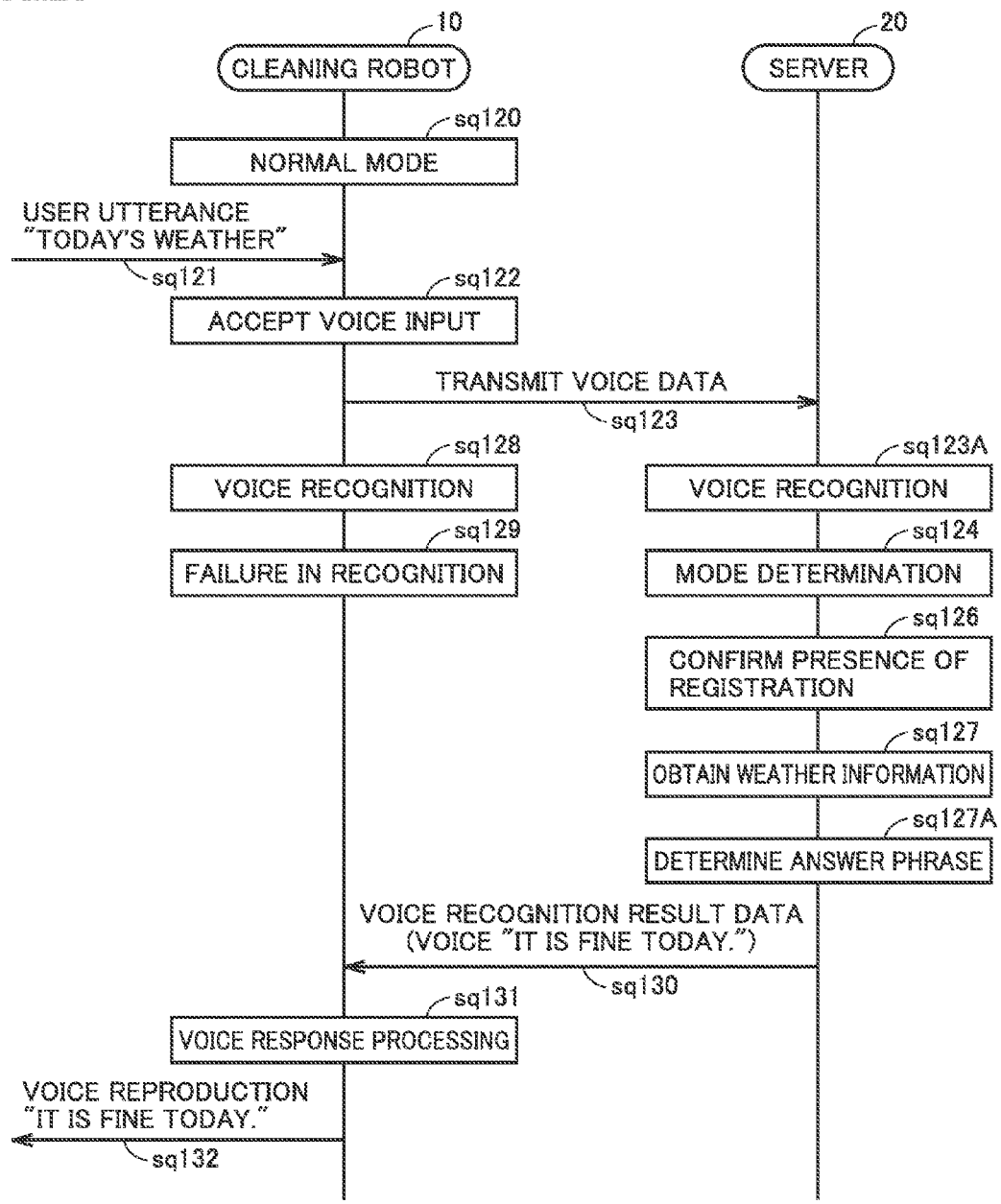
FIG. 20 is a sequence diagram showing a flow of response processing in obtaining weather information (No. 2) in voice recognition system 1 based on the fourth embodiment.

FIG. 20 is a sequence diagram showing a flow of response processing in obtaining weather information (No. 2) in voice recognition system 1 based on the fourth embodiment.

As shown in FIG. 20, initially, cleaning robot 10 is set to the normal mode (sequence sq120).

Then, user utterance "Today's weather" is given (sequence sq121).

Then, cleaning robot 10 accepts voice input from the user (sequence sq122). Specifically, voice input acceptance portion 114 of cleaning robot 10 accepts input of sound from the outside through microphone 103.

Then, cleaning robot 10 outputs voice data to server 20 (sequence sq123). Specifically, voice input acceptance portion 114 provides an output to server 20 through communication portion 101.

Then, server 20 receives the voice data transmitted from cleaning robot 10 and carries out voice recognition (sequence sq123A). Specifically, voice recognition portion 222 obtains the recognition phrase "Today's weather". Then, voice recognition portion 222 outputs the result to response processing execution instruction portion 224.

Then, server 20 makes mode determination (sequence sq124). Specifically, response processing execution instruction portion 224 makes mode determination for determining a state of cleaning robot 10. Mode determination is processing for setting a voice recognition dictionary in accordance with a state in accordance with a state of cleaning robot 10 stored in state storage portion 233. In the present example, server 20 makes setting to the "normal dictionary" in the case of the cleaning robot having "ID1", that is, in the "normal mode" by way of example.

Then, server 20 confirms presence of registration (sequence sq126). Specifically, response processing execution instruction portion 224 determines a content of response to a voice content which is a result obtained from voice recognition portion 222.

In the present example, for example, when the normal dictionary described with reference to FIG. 10 is used, two patterns are provided as answer phrases for the recognition phrase "Today's weather". Specifically, categorization into presence of registration of a postal code "registered: weather information" and absence of registration of a postal code "not registered: I initially set postal code. Say like one, zero, three" is made.

Therefore, response processing execution instruction portion 224 checks whether or not a postal code for cleaning robot 10 stored in state storage portion 233 has been set.

Then, in the present example, response processing execution instruction portion 224 confirms presence of registration by way of example.

Then, server 20 obtains weather information (sequence sq127). Specifically, response processing execution instruction portion 224 obtains weather information in accordance with the set and registered postal code. Specifically, server 20 transmits information on the set and registered postal code to a known external server which can obtain weather information and obtains weather information associated with the postal code and transmitted from the external server.

Then, server 20 determines an answer phrase (sequence sq127A).

Specifically, response processing execution instruction portion 224 determines a content of response to a voice content which is a result obtained from voice recognition portion 222. In the present example, for example, when the normal dictionary described with reference to FIG. 10 is used, an answer phrase "weather information" for "registered" is determined as the response content in correspondence with the recognition phrase "Today's weather". "Weather information" is "It is ZZZ today." "ZZZ" is information on weather obtained from the external server, such as "fine", "rainy", and "cloudy". Information on a temperature or chance of rain may be included.

Then, server 20 transmits the voice recognition result data resulting from voice recognition to cleaning robot 10 (sequence sq130). Specifically, response processing execution instruction portion 224 transmits voice "It is fine today" as the voice recognition result data to cleaning robot 10 through communication portion 201.

After sequence sq123, cleaning robot 10 carries out voice recognition of the voice data (sequence sq128). Specifically, voice recognition portion 111 recognizes a voice content in accordance with the voice data generated by voice input acceptance portion 114. Then, a result of recognition of the voice content is output to response processing execution portion 112.

Then, cleaning robot 10 fails in recognition (sequence sq129). Since no answer phrase corresponding to the recognition phrase "Today's weather" is provided in utterance content database 120 of cleaning robot 10 in the present example, recognition has failed.

Then, cleaning robot 10 performs voice response processing based on the voice recognition result data transmitted from server 20 (sequence sq131). Specifically, response processing execution portion 112 reproduces an audio file of the voice recognition result data (It is fine today"). Namely, cleaning robot 10 responds (utters) with voice ("It is fine today") to the user through speaker 104 (sequence sq132).

Thus, when the postal code is set, weather information corresponding to the postal code is obtained and utterance can be given.

(Flowchart)

Figure 21:
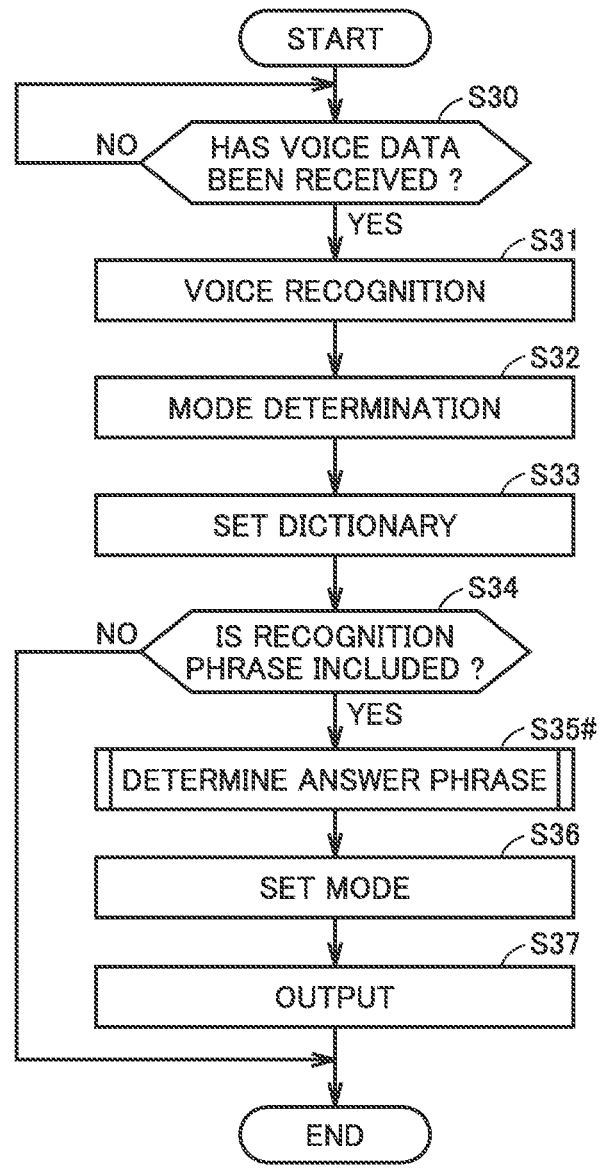
FIG. 21 is a flowchart for performing voice recognition processing by server 20 based on the present fourth embodiment.

FIG. 21 is a flowchart for execution of voice recognition processing by server 20 based on the present fourth embodiment.

Referring to FIG. 21, the flowchart shows processing performed as a program stored in storage portion 203 is executed to function each portion in control unit 202.

As compared with the flowchart in FIG. 17, though processing for determining an answer phrase is different (step S35#), the flow is otherwise the same as in FIG. 17 and hence detailed description will not be repeated.

Figure 22:
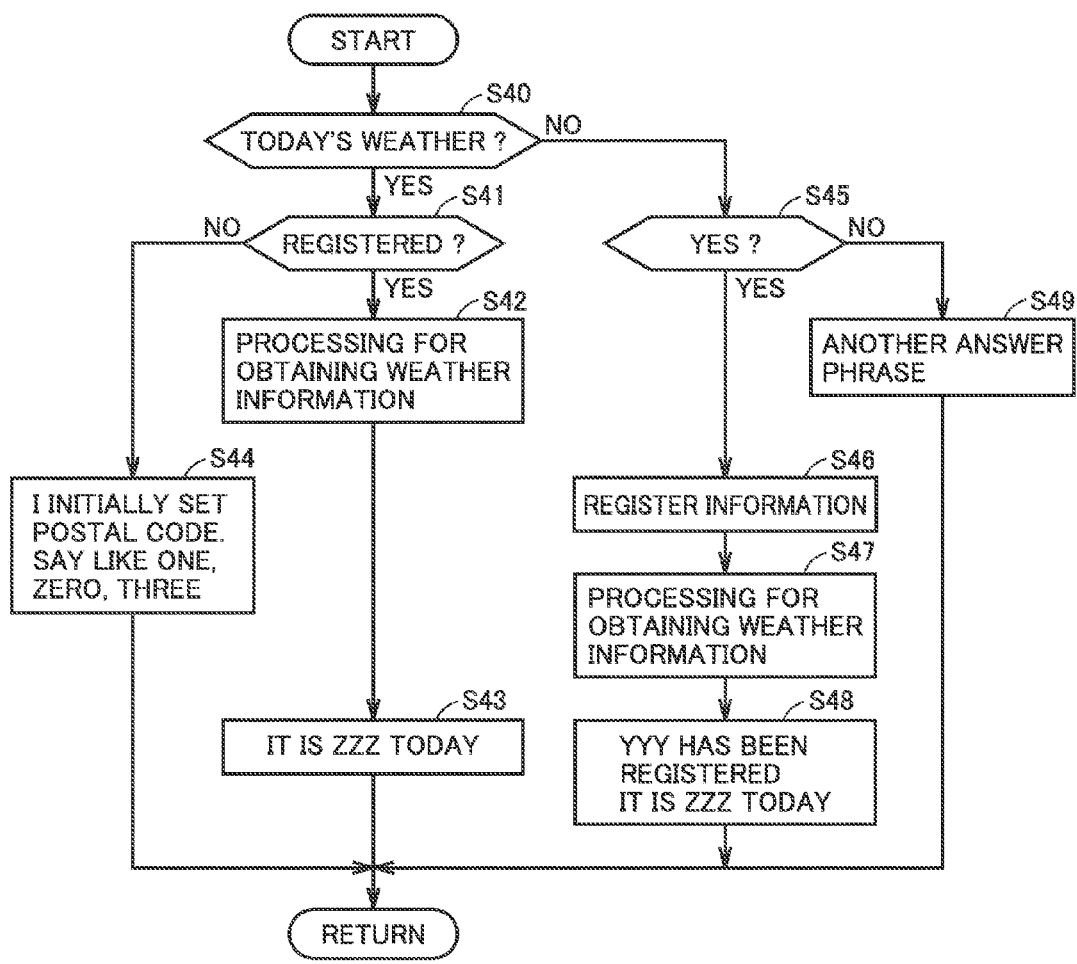
FIG. 22 is a sub flow diagram of processing for determining an answer phrase based on the present fourth embodiment.

FIG. 22 is a sub flow diagram of processing for determining an answer phrase based on the present fourth embodiment.

Referring to FIG. 22, response processing execution instruction portion 224 determines whether or not a recognition phrase is "Today's weather" (step S40). Specifically, whether or not a recognition content recognized by voice recognition portion 222 is "Today's weather" is determined.

When response processing execution instruction portion 224 determines in step S40 that the recognition phrase is "Today's weather" (YES in step S40), whether or not a postal code has been registered is determined (step S41).

When response processing execution instruction portion 224 determines in step S41 that a postal code has been registered (YES in step S41), processing for obtaining weather information is performed (step S42).

Then, in step S43, response processing execution instruction portion 224 determines "It is ZZZ today" as an answer phrase. Then, the process ends (return).

When response processing execution instruction portion 224 determines in step S41 that no postal code has been registered (NO in step S41), determination of "I initially set postal code. Say like one, zero, three" as an answer phrase is made. Then, the process ends (return).

When response processing execution instruction portion 224 determines that the recognition phrase is not "Today's weather" (NO in step S40), it determines whether or not the recognition phrase is "Yes" (step S45).

When response processing execution instruction portion 224 determines in step S45 that the recognition phrase is "Yes" (YES in step S45), information is registered (step S46). Specifically, information on a postal code obtained through user utterance is registered in a field of a postal code for cleaning robot 10 stored in state storage portion 233.

Then, response processing execution instruction portion 224 performs processing for obtaining weather information (step S47). Specifically, weather information is obtained in accordance with the set and registered postal code. In this regard, information on the set and registered postal code is transmitted to a known external server which can obtain weather information and weather information associated with the postal code and transmitted from the external server is obtained.

Then, in step S48, response processing execution instruction portion 224 determines "YYY has been registered. It is ZZZ today" as the answer phrase. Then, the process ends (return).

When response processing execution instruction portion 224 determines in step S45 that the recognition phrase is not "Yes" (NO in step S45), it decides on another answer phrase (step S49). Specifically, response processing execution instruction portion 224 determines an answer phrase corresponding to the recognition phrase.

Then, response processing execution instruction portion 224 ends the process.

Though an external server is accessed for obtaining weather information and utterance is given from cleaning robot 10 in the server mode in the present example, information which can be obtained is not particularly limited to "weather information" and any information is applicable so long as information can be obtained from another external server. For example, latest news or topics can also be uttered from cleaning robot 10, or information on answers to users' questions can also be obtained for utterance from cleaning robot 10.

Fifth Embodiment

Figure 23:
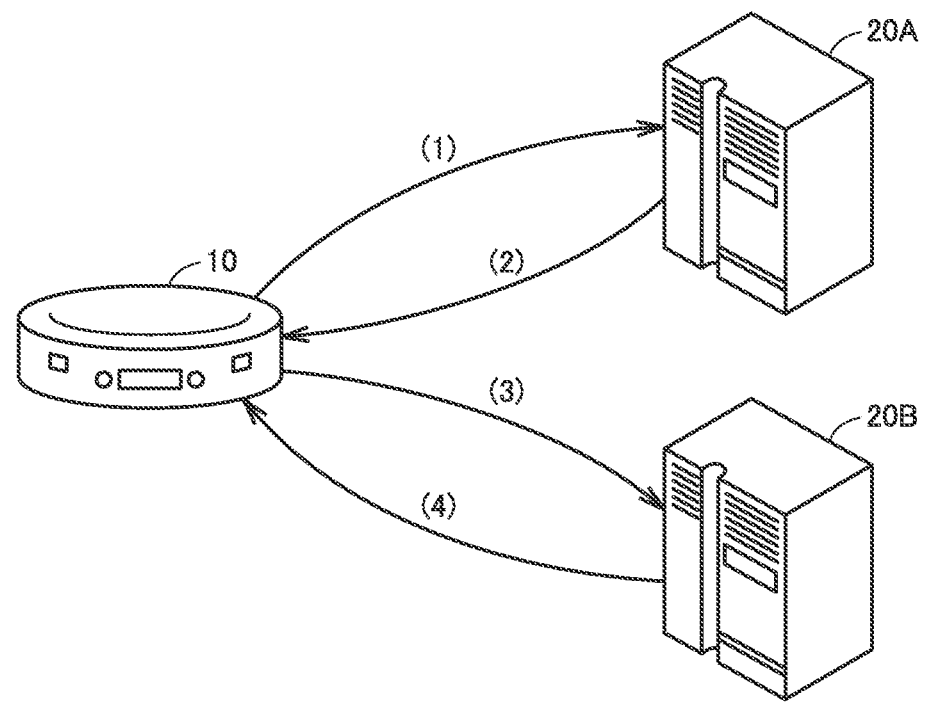
FIG. 23 is a diagram illustrating a configuration of a server based on the present fifth embodiment.

FIG. 23 is a diagram illustrating a configuration of a server based on the present fifth embodiment.

Referring to FIG. 23, a plurality of servers are provided in the present example.

In the present example, by way of example, a server 20A and a server 20B are provided.

In the configuration above, though voice recognition and processing for determining a phrase for answering voice recognition are performed by the same server, the processing can also be performed by servers independent of each other.

Specifically, server 20A may carry out voice recognition of voice data and server 20B may output voice recognition result data representing an answer phrase to cleaning robot 10.

For example, voice data is transmitted from cleaning robot 10 to server 20A (1). Server 20A carries out voice recognition of the voice data. Then, server 20A transmits a recognition phrase to cleaning robot 10 (2.

Cleaning robot 10 receives the recognition phrase from server 20A and transmits the recognition phrase to another server 20B (3.

Server 20B receives the recognition phrase from cleaning robot 10 and determines an answer phrase corresponding to the recognition phrase. Then, server 20B transmits voice recognition result data to the cleaning robot (4).

Though server 20A transmits a recognition phrase resulting from voice recognition of voice data to cleaning robot 10 in the present example, limitation to a recognition phrase is not intended and any information is applicable so long as information represents a result of voice recognition. For example, access information necessary for accessing an answer phrase stored in server 20B (uniform resource locator (URL)) may be applicable. For example, cleaning robot 10 may receive the access information (URL) from server 20A and an answer phrase may be obtained from server 20B by accessing server 20B. Limitation to access information is not intended, and when an answer phrase stored in server 20B is saved in a file format, information designating a file name may be applicable as information representing a result of voice recognition from server 20A. For example, cleaning robot 10 can receive the file name from server 20A and can obtain a file associated with an answer phrase from server 20B by requesting information from server 20B by designating a file name.

Similarly, text information obtained by converting a recognition phrase to text may be transmitted as information representing a result of voice recognition from server 20A. Cleaning robot 10 may extract a recognition phrase from the text information and obtain an answer phrase by accessing server 20B, or the text information may be transmitted to server 20B so that server 20B analyzes the text information including the recognition phrase, determines an answer phrase based on a result of analysis, and transmits the answer phrase to cleaning robot 10.

A configuration in which server 20B transmits an answer phrase as voice recognition result data to be transmitted to cleaning robot 10 has been described. Specifically, an audio file corresponding to an answer phrase is transmitted and cleaning robot 10 utters in accordance with the audio file, however, limitation to an audio file is not intended, and text information including an answer phrase may be transmitted and cleaning robot 10 may analyze and utter the text information (what is called a reading function).

Though a phrase answering to a result of voice recognition in cleaning robot 10 is determined in cleaning robot 10 in the present example, an answer phrase may be obtained from server 20B after cleaning robot 10 carries out voice recognition. In that case, a URL correspondence table in which access information (URL) for access to a phrase answering to a recognition phrase in server 20B is brought in correspondence may be provided in storage portion 109.

A phrase answering to a result of voice recognition can also be obtained by making use of information saved in cleaning robot 10.

For example, when information on a phrase answering to a previously used recognition phrase is included in a cache memory which can temporarily store information, information on the answer phrase stored in the cache memory is made use of, so that, for example, an answer phrase can also be obtained without accessing server 20B and cleaning robot 10 can utter. Thus, early utterance can be given by making use of information stored in a cache memory.

When an audio file corresponding to an answer phrase is saved in cleaning robot 10, server 20A may designate the audio file saved in cleaning robot 10 as information representing a result of voice recognition. Through the processing, without accessing server 20B, early utterance can be given by making use of the audio file saved in cleaning robot 10. When no audio file is saved in cleaning robot 10, a designated audio file may be requested to server 20B so that the audio file is obtained from server 20B for utterance.

A configuration of the server in the present fifth embodiment is applicable to any of the first to fourth embodiments above.

Sixth Embodiment

A control block of cleaning robot 10 and server 20 may be implemented by a logic circuit (hardware) formed in an integrated circuit (an IC chip) or implemented by software by using a central processing unit (a CPU).

In the latter case, cleaning robot 10 and server 20 include a CPU executing instructions of a program which is software implementing each function, a read only memory (a ROM) or a storage device (which is referred to as a "recording medium") in which the program or various data is recorded in a computer- (or CPU-)readable manner, or a random access memory (a RAM) developing the program. As the computer (or the CPU) reads and executes the program from the recording medium, the object of the present disclosure is achieved. As the recording medium, a "non-transitory tangible medium" such as a tape, a disc, a card, a semiconductor memory, or a programmable logic circuit can be employed. The program may be supplied to the computer through any transmission medium (a communication network or broadcast waves) which can transmit the program. The present disclosure can be implemented also in a form of a data signal embedded in carrier waves, in which the program is embodied by electronic transmission.

(Summary)

The voice recognition terminal (cleaning robot 10) according to the first aspect of the present disclosure is provided to be able to communicate with server 20 capable of voice recognition for recognizing voice, and includes voice input acceptance portion 114 accepting voice input from a user, voice recognition portion 111 carrying out voice recognition of the voice input accepted by voice input acceptance portion 114, response processing execution portion 112 performing processing for responding to the user based on a result of voice recognition of the voice input accepted by voice input acceptance portion 114, and communication portion 101 transmitting the voice input accepted by voice input acceptance portion 114 to the server and receiving a result of voice recognition in the server. Response processing execution portion 112 performs the processing for responding to the user based on the result of voice recognition obtained earlier, of the result of voice recognition by voice recognition portion 111 and the result of voice recognition received from the server.

According to the configuration above, response processing execution portion 112 performs processing for responding to the user based on the earlier obtained result of voice recognition, of the result of voice recognition by voice recognition portion 111 and the result of voice recognition received from the server. Therefore, a time for response from the voice recognition terminal is shortened and smooth communication can be carried out without imposing stress to a user.

Response processing execution portion 112 of the voice recognition terminal (cleaning robot 10) according to the second aspect of the present disclosure does not have to perform the processing for responding to the user based on the later obtained result of voice recognition.

In the voice recognition terminal (cleaning robot 10) according to the third aspect of the present disclosure, voice recognition recognizes voice and calculates reliability indicating correctness of recognition, and response processing execution portion 112 may further perform the processing for responding to the user based on the later obtained result of voice recognition when reliability included in the later obtained result of voice recognition is higher than reliability included in the earlier obtained result of voice recognition, in connection with reliability included in the result of voice recognition by voice recognition portion 111.

Response processing execution portion 112 of the voice recognition terminal (cleaning robot 10) according to the fourth aspect of the present disclosure may further perform the processing for responding to the user based on the later obtained result of voice recognition when reliability included in the earlier obtained result of voice recognition is equal to or lower than prescribed reliability and when reliability included in the later obtained result of voice recognition is higher than reliability included in the earlier obtained result of voice recognition, in connection with reliability included in the result of voice recognition by voice recognition portion 111.

Operation mode switching portion 113 switching between the server mode in which the voice recognition terminal operates in accordance with an instruction from the server and the normal mode in which the voice recognition terminal operates by selectively making use of the instruction from the server based on the result of voice recognition of the voice input provided to voice input acceptance portion 114 of the voice recognition terminal (cleaning robot 10) according to the fifth aspect of the present disclosure may further be provided.

Response processing execution portion 112 of the voice recognition terminal (cleaning robot 10) according to the sixth aspect of the present disclosure may invalidate the result of voice recognition by the voice recognition portion in the server mode.

Server 20 according to the seventh aspect of the present disclosure is provided to be able to communicate with a voice recognition terminal (cleaning robot 10) capable of voice recognition for recognizing voice and it includes voice input reception portion 221 receiving voice input from a user through the voice recognition terminal, voice recognition portion 222 carrying out voice recognition of the voice input received by voice input reception portion 221, and response processing execution instruction portion 224 instructing the voice recognition terminal to perform processing for responding to the user based on a result of voice recognition of the voice input received by voice input reception portion 221, and response processing execution instruction portion 224 instructs the voice recognition terminal to switch from the normal mode in which the voice recognition terminal operates by selectively making use of an instruction from the server to the server mode instructing the voice recognition terminal to operate in accordance with the instruction from the server.

According to the configuration above, response processing execution instruction portion 224 indicates switching from the normal mode to the server mode. Therefore, when processing by server 20 is more appropriate depending on a content of voice recognition, with the switching processing, a time for response from the voice recognition terminal can be shortened and smooth communication can be carried out without imposing stress to a user.

Response processing execution instruction portion 224 of server 20 according to the eighth aspect of the present disclosure determines whether or not the result of voice recognition of the voice input accepted by voice input reception portion 221 is a request for a query about prescribed information from the user, determines whether or not data for obtaining the prescribed information has been registered when it is determined that the result is the request for the query about the prescribed information, and indicates execution of response processing inviting the user to input the data when the data for obtaining the prescribed information has not been registered, based on a result of determination.

A method of controlling server 20 according to the ninth aspect of the present disclosure is a method of controlling server 20 provided to be able to communicate with a voice recognition terminal (cleaning robot 10) capable of voice recognition for recognizing voice and it includes the steps of receiving voice input from a user through the voice recognition terminal (step S30), carrying out voice recognition of the received voice input (step S31), and instructing the voice recognition terminal to perform processing for responding to the user based on a result of voice recognition of the received voice input (steps S35 to S37), and the step of instructing the voice recognition terminal to perform processing for responding includes the step of indicating switching from the normal mode in which the voice recognition terminal operates by selectively making use of an instruction from the server to the server mode instructing the voice recognition terminal to operate in accordance with the instruction from the server.

According to the configuration above, switching from the normal mode to the server mode is indicated. Therefore, when processing by server 20 is more appropriate depending on a content of voice recognition, with the switching processing, a time for response from the voice recognition terminal is shortened and smooth communication can be carried out without imposing stress to a user.

Voice recognition system 1 according to the tenth aspect of the present disclosure includes server 20 capable of voice recognition for recognizing voice and a voice recognition terminal (cleaning robot 10) provided to be able to communicate with server 20. The voice recognition terminal includes voice input acceptance portion 114 accepting voice input from a user, voice recognition portion 111 carrying out voice recognition of the voice input accepted by voice input acceptance portion 114, response processing execution portion 112 performing processing for responding to the user based on a result of voice recognition of the voice input accepted by voice input acceptance portion 114, and communication portion 101 transmitting the voice input accepted by voice input acceptance portion 114 to the server and receiving a result of voice recognition in the server. Response processing execution portion 112 performs the processing for responding to the user based on the result of voice recognition obtained earlier, of the result of voice recognition by voice recognition portion 111 and the result of voice recognition received from the server.

According to the configuration above, response processing execution portion 112 performs the processing for responding to the user based on the result of voice recognition obtained earlier, of the result of voice recognition by voice recognition portion 111 and the result of voice recognition received from the server. Therefore, a time for response from the voice recognition terminal is shortened and smooth communication without imposing stress to the user can be carried out.

A control program according to the eleventh aspect of the present disclosure is executed in a computer of a voice recognition terminal provided to be able to communicate with a server capable of voice recognition for recognizing voice, and the control program causes the computer to perform the steps of accepting voice input from a user (step S1), carrying out voice recognition of the accepted voice input (step S4), performing processing for responding to the user based on a result of voice recognition of the accepted voice input (steps S5 to S8, S15, and S16), and transmitting the accepted voice input to the server and receiving a result of voice recognition in the server (step S3), and the step of performing the processing for responding performs processing for responding to the user based on the result of voice recognition obtained earlier, of the result of voice recognition based on the step of carrying out voice recognition and the result of voice recognition received from the server.

According to the configuration above, in the step of performing the response processing, the processing for responding to the user is performed based on the result of voice recognition obtained earlier, of the result of voice recognition and the result of voice recognition received from the server. Therefore, a time for response from the voice recognition terminal is shortened and smooth communication without imposing stress to the user can be carried out.

A control program according to the twelfth aspect of the present disclosure is executed in a computer of a server provided to be able to communicate with a voice recognition terminal capable of voice recognition for recognizing voice, and the control program causes the computer to perform the steps of receiving voice input from a user through the voice recognition terminal (step S30), carrying out voice recognition of the received voice input (step S31), and instructing the voice recognition terminal to perform processing for responding to the user based on a result of voice recognition of the received voice input (steps S35 to S37), and the step of instructing the voice recognition terminal to perform processing for responding includes the step of indicating switching from the normal mode in which the voice recognition terminal operates by selectively making use of an instruction from the server to the server mode instructing the voice recognition terminal to operate in accordance with the instruction from the server.

According to the configuration above, switching from the normal mode to the server mode is indicated. Therefore, when processing by server 20 is more appropriate depending on a content of voice recognition, with the switching processing, a time for response from the voice recognition terminal is shortened and smooth communication can be carried out without imposing stress to a user.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A voice recognition terminal provided to be able to communicate with a server capable of voice recognition for recognizing voice and calculating reliability indicating correctness of recognition, comprising:
    a voice input acceptance portion accepting voice input from a user;
    a voice recognition portion carrying out voice recognition of the voice input accepted by said voice input acceptance portion;
    a response processing execution portion performing processing for responding to said user based on a result of voice recognition of the voice input accepted by said voice input acceptance portion; and
    a communication portion transmitting the voice input accepted by said voice input acceptance portion to said server and receiving a result of voice recognition in said server,
    said response processing execution portion performing the processing for responding to said user based on the result of voice recognition determined as more suitable, of the result of voice recognition by said voice recognition portion and the result of voice recognition received from said server, wherein
    said voice recognition portion recognizes said voice and calculates reliability indicating correctness of recognition, and
    said response processing execution portion further performs the processing for responding to said user based on the result of voice recognition obtained later between the result of voice recognition received from said server and the result of voice recognition carried out by the voice recognition portion, when reliability included in the later obtained result of voice recognition is higher than reliability included in the result of voice recognition obtained earlier, in connection with reliability included in the result of voice recognition by said voice recognition portion, such that smooth communication can be carried out with the user without imposing stress to the user.

2. The voice recognition terminal according to claim 1, wherein
    said response processing execution portion further performs the processing for responding to said user based on the later obtained result of voice recognition when reliability included in the earlier obtained result of voice recognition is equal to or lower than prescribed reliability and when the reliability included in the later obtained result of voice recognition is higher than the reliability included in the earlier obtained result of voice recognition, in connection with reliability included in the result of voice recognition by said voice recognition portion.

3. The voice recognition terminal according to claim 1, further comprising an operation mode switching portion switching between a server mode in which said voice recognition terminal operates in accordance with an instruction from said server and a normal mode in which said voice recognition terminal operates by selectively making use of the instruction from said server, based on the result of voice recognition of the voice input provided to said voice input acceptance portion.

4. The voice recognition terminal according to claim 3, wherein
    said response processing execution portion invalidates the result of voice recognition by said voice recognition portion in said server mode.

5. A server provided to be able to communicate with a voice recognition terminal capable of voice recognition for recognizing voice and calculating reliability indicating correctness of recognition, comprising:
    a voice input reception portion receiving voice input from a user through said voice recognition terminal;
    a voice recognition portion carrying out voice recognition of the voice input received by said voice input reception portion; and
    a response processing execution instruction portion instructing said voice recognition terminal to perform processing for responding to said user based on a result of voice recognition of the voice input received by said voice input reception portion,
    said response processing execution instruction portion instructing said voice recognition terminal to switch from a normal mode in which said voice recognition terminal operates by selectively making use of an instruction from said server to a server mode instructing said voice recognition terminal to operate in accordance with the instruction from said server, wherein
    said voice recognition portion recognizes said voice and calculates reliability indicating correctness of recognition, and
    said response processing execution portion further performs the processing for responding to said user based on the result of voice recognition obtained later between a result of voice recognition carried out by the voice recognition terminal and the result of voice recognition carried out by the voice recognition portion, when reliability included in the later obtained result of voice recognition is higher than reliability included in the result of voice recognition obtained earlier, in connection with reliability included in the result of voice recognition by said voice recognition portion, such that smooth communication can be carried out with the user without imposing stress to the user.

6. The server according to claim 5, wherein
    said response processing execution instruction portion
        determines whether the result of voice recognition of the voice input accepted by said voice input reception portion is a request for a query about prescribed information from said user,
        determines whether data for obtaining the prescribed information has been registered when it is determined that the result is the request for the query about said prescribed information, and
        indicates execution of response processing inviting said user to input said data when the data for obtaining the prescribed information has not been registered, based on a result of determination.

7. A method of controlling a server provided to be able to communicate with a voice recognition terminal capable of voice recognition for recognizing voice and calculating reliability indicating correctness of recognition, comprising:
    receiving voice input from a user through said voice recognition terminal;
    carrying out voice recognition of the received voice input; and
    instructing said voice recognition terminal to perform processing for responding to said user based on a result of voice recognition of the received voice input, instructing said voice recognition terminal to perform processing for responding including indicating switching from a normal mode in which said voice recognition terminal operates by selectively making use of an instruction from said server to a server mode instructing said voice recognition terminal to operate in accordance with the instruction from said server, wherein said step of carrying out voice recognition includes recognizing, said voice and calculating reliability indicating correctness of recognition, and said step of instructing said voice recognition terminal includes further performing the processing for responding to said user based on the result of voice recognition obtained later between a result of voice recognition carried out by the voice recognition terminal and the result of voice recognition carried out in the step of carrying out voice recognition, when reliability included in the later obtained result of voice recognition is higher than reliability included in the result of voice recognition obtained earlier, in connection with reliability included in the result of voice recognition by said step of carrying out voice recognition, such that smooth communication can be carried out with the user without imposing stress to the user.

8. A voice recognition system, comprising:
a server capable of voice recognition for recognizing voice and calculating reliability indicating correctness of recognition; and
a voice recognition terminal provided to be able to communicate with said server,
said voice recognition terminal including
a voice input acceptance portion accepting voice input from a user,
a voice recognition portion carrying out voice recognition of the voice input accepted by said voice input acceptance portion,
a response processing execution portion performing processing for responding to said user based on a result of voice recognition of the voice input accepted by said voice input acceptance portion, and
a communication portion transmitting the voice input accepted by said voice input acceptance portion to said server and receiving a result of voice recognition in said server, and
said response processing execution portion performing the processing for responding to said user based on the result of voice recognition determined as more suitable, of the result of voice recognition by said voice recognition portion and the result of voice recognition received from said server, wherein
said voice recognition portion recognizes said voice and calculates reliability indicating correctness of recognition, and
said response processing execution portion further performs the processing for responding to said user based on the result of voice recognition obtained later between a result of voice recognition carried out by the server and the result of voice recognition carried out by the voice recognition portion, when reliability included in the later obtained result of voice recognition is higher than reliability included in the result of voice recognition obtained earlier, in connection with reliability included in the result of voice recognition by said voice recognition portion, such that smooth communication can be carried out with the user without imposing stress to the user.

9. A method of controlling a voice recognition terminal provided to be able to communicate with a server capable of voice recognition for recognizing voice and calculating reliability indicating correctness of recognition, comprising:
accepting voice input from a user;
carrying out voice recognition of the accepted voice input;
performing processing for responding to said user based on a result of voice recognition of the accepted voice input; and
transmitting the accepted voice input to said server and receiving a result of voice recognition in said server,
performing processing for responding including performing processing for responding to said user based on the result of voice recognition determined as more suitable, of the result of voice recognition of said accepted voice input and the result of voice recognition received from said server, wherein
said step of carrying out voice recognition includes recognizing said voice and calculating reliability indicating correctness of recognition, and
said step of performing processing for responding includes further performing processing for responding to said user based on the result of voice recognition obtained later between the result of voice recognition carried out b the server and the result of voice recognition carried out by the voice recognition portion, when reliability included in the later obtained result of voice recognition is higher than reliability included in the result of voice recognition obtained earlier, in connection with reliability included in the result of voice recognition by said step of carrying out voice recognition, such that smooth communication can be carried out with the user without imposing stress to the user.

10. The method of controlling a voice recognition terminal according to claim 9, wherein
performing said processing for responding includes further performing the processing for responding to said user based on the later obtained result of voice recognition when reliability included in the earlier obtained result of voice recognition is equal to or lower than prescribed reliability and when reliability included in the later obtained result of voice recognition is higher than reliability included in the earlier obtained result of voice recognition, in connection with reliability included in the result of voice recognition of said accepted voice input.

11. The method of controlling a voice recognition terminal according to claim 9, further comprising switching between a server mode in which said voice recognition terminal operates in accordance with an instruction from said server and a normal mode in which said voice recognition terminal operates by selectively making use of the instruction from said server, based on the result of voice recognition of said accepted voice input.

12. The method of controlling a voice recognition terminal according to claim 11, wherein
performing said processing for responding includes invalidating the result of voice recognition of said accepted voice input in said server mode.

* * * * *